(12) United States Patent
Casey et al.

(10) Patent No.: US 12,543,888 B2
(45) Date of Patent: Feb. 10, 2026

(54) DECORATIVE HOLDER FOR FOODSTUFF TRAYS, TINS, AND PANS

(71) Applicant: Sugar Beets, LLC, Agoura Hills, CA (US)

(72) Inventors: Jane Casey, Agoura Hills, CA (US); Andy Cykman, Agoura Hills, CA (US); Mark Snyker, Apple Valley, MN (US)

(73) Assignee: Sugar Beets, LLC, Agoura Hills, CA (US)

( * ) Notice: Subject to any disclaimer, the term of this patent is extended or adjusted under 35 U.S.C. 154(b) by 34 days.

(21) Appl. No.: 18/390,622

(22) Filed: Dec. 20, 2023

(65) Prior Publication Data
US 2024/0115072 A1    Apr. 11, 2024

Related U.S. Application Data

(63) Continuation of application No. 17/104,920, filed on Nov. 25, 2020, now Pat. No. 11,889,949.

(51) Int. Cl.
*A47G 19/08* (2006.01)
*A47G 19/12* (2006.01)
(Continued)

(52) U.S. Cl.
CPC .............. *A47J 36/34* (2013.01); *A47G 19/08* (2013.01); *A47G 19/12* (2013.01); *A47G 23/04* (2013.01);
(Continued)

(58) Field of Classification Search
CPC ........ A47G 19/08; A47G 19/12; A47G 23/04; A47J 36/34; A47J 39/006; A47J 47/14; B65D 43/22; B65D 85/36; B65D 25/108
(Continued)

(56) References Cited

U.S. PATENT DOCUMENTS 1,165,304 A * 12/1915 Whittaker .............. B65D 71/72
                                                         312/351
2,064,411 A   12/1936 Brandstein
(Continued)

FOREIGN PATENT DOCUMENTS

NL        1009571 C2    1/2000
WO     2017001083       1/2017

OTHER PUBLICATIONS

Inline Plastics, Essentials ValuPack, retrieved from inlineplastics.com on Sep. 26, 2022.

*Primary Examiner* — Gideon R Weinerth
(74) *Attorney, Agent, or Firm* — Andrus Intellectual Property Law, LLP

(57) ABSTRACT

A decorative holder for foodstuff trays, tins, and pans is provided. The decorative holder includes a receptacle having a partially corrugated bottom wall, a pair of opposing side walls, and a pair of opposing end walls. The side walls and the end walls extend upwardly from an outer periphery of the corrugated bottom wall and terminate in a top edge. The decorative holder further includes a lid that is hingably coupled to the top edge of the receptacle and configured to pivot between an opened position and a closed position, the lid defining a central opening providing access to an interior region of the decorative holder when disposed atop the receptacle. The receptacle and the lid are configured to hold and generally encapsulate a foodstuff tray, tin, or pan therebetween.

19 Claims, 25 Drawing Sheets

(51) Int. Cl.
    *A47G 23/04*     (2006.01)
    *A47J 36/34*     (2006.01)
    *A47J 39/00*     (2006.01)
    *B65D 43/22*     (2006.01)
    *B65D 85/36*     (2006.01)

(52) U.S. Cl.
    CPC ............. *A47J 39/006* (2013.01); *B65D 43/22* (2013.01); *B65D 85/36* (2013.01)

(58) Field of Classification Search
    USPC .................................. 220/574; D7/610, 629
    See application file for complete search history.

(56) References Cited

U.S. PATENT DOCUMENTS

| | | | |
|---|---|---|---|
| 2,146,190 A | 2/1939 | Luke | |
| 2,210,521 A * | 8/1940 | Bemis | B65D 81/3813 |
| | | | D7/357 |
| 2,583,350 A | 1/1952 | Witzgall | |
| 2,746,081 A | 5/1956 | Gershen | |
| 3,069,043 A | 12/1962 | David | |
| 3,091,357 A | 5/1963 | Martin | |
| 3,130,288 A | 4/1964 | Monaco et al. | |
| 3,285,464 A | 11/1966 | Boydman | |
| 3,338,468 A | 8/1967 | Wilson | |
| 3,443,714 A | 5/1969 | Edwards | |
| 3,484,035 A * | 12/1969 | Swett | B65D 43/0218 |
| | | | 206/521.1 |
| 3,516,115 A | 6/1970 | Koleske | |
| 3,782,592 A | 1/1974 | Bergh et al. | |
| 3,809,305 A | 5/1974 | Persson | |
| 4,002,773 A * | 1/1977 | Entenmann | B65D 85/36 |
| | | | 426/392 |
| 4,212,415 A | 7/1980 | Neely | |
| 4,216,862 A | 8/1980 | Daenen | |
| 4,366,915 A | 1/1983 | Seidler | |
| 4,720,023 A | 1/1988 | Jeff | |
| 4,807,776 A | 2/1989 | Cortopassi | |
| 5,048,715 A | 9/1991 | Wolff | |
| 5,307,647 A | 5/1994 | McClure | |
| D348,378 S * | 7/1994 | Crane | D7/610 |
| 5,513,909 A | 5/1996 | Teich | |
| 5,538,136 A * | 7/1996 | Onneweer | B65D 85/324 |
| | | | 206/508 |
| 5,539,955 A | 7/1996 | Wiese | |
| 5,551,589 A | 9/1996 | Nakamura | |
| 5,701,757 A | 12/1997 | Heverly | |
| D396,999 S * | 8/1998 | Boothe | D7/610 |
| 5,899,353 A | 5/1999 | Sabin et al. | |
| 5,912,033 A * | 6/1999 | Ferguson | B65D 25/02 |
| | | | 426/119 |
| 5,964,368 A | 10/1999 | Schramm | |
| 5,967,323 A * | 10/1999 | Siragusa | B65D 25/108 |
| | | | 220/780 |
| 6,003,203 A | 12/1999 | Fowlston | |
| 6,146,673 A * | 11/2000 | Ferguson | B65D 25/108 |
| | | | 220/660 |
| D436,502 S * | 1/2001 | Brock | D7/610 |
| 6,296,120 B1 * | 10/2001 | Danko | B65D 5/503 |
| | | | 229/906 |
| 6,313,446 B1 | 11/2001 | Jones | |
| 6,450,341 B1 * | 9/2002 | Krupa | B65D 5/5038 |
| | | | 426/106 |
| 6,901,632 B2 | 6/2005 | Boyce | |
| 7,131,289 B2 | 11/2006 | Harl et al. | |
| D553,902 S * | 10/2007 | Barber | D7/357 |
| 7,282,983 B2 | 10/2007 | Janssen et al. | |
| 7,288,745 B2 | 10/2007 | Colonna | |
| D572,539 S * | 7/2008 | Swinford | D7/610 |
| D597,370 S * | 8/2009 | Watkins | D7/354 |
| 7,832,586 B2 | 11/2010 | Vovan | |
| 7,891,521 B2 | 2/2011 | Salice | |
| 7,922,027 B2 | 4/2011 | Boyden et al. | |
| D659,483 S * | 5/2012 | Dagan | D7/610 |
| 8,308,021 B2 | 11/2012 | Turvey et al. | |
| 8,464,889 B1 * | 6/2013 | Keithley | A47J 47/14 |
| | | | 220/4.23 |
| 8,545,914 B1 * | 10/2013 | Mastroianni | B65D 85/36 |
| | | | 206/508 |
| D699,081 S * | 2/2014 | Dagan | D7/610 |
| 8,887,943 B1 | 11/2014 | Miller | |
| 8,899,438 B2 | 12/2014 | Leonard et al. | |
| 8,919,590 B2 | 12/2014 | Gillette et al. | |
| 9,010,566 B2 | 4/2015 | Miller | |
| D733,314 S * | 6/2015 | Lui | D24/227 |
| 9,387,963 B2 | 7/2016 | McBroom et al. | |
| 9,414,610 B2 * | 8/2016 | Guerrero | A23B 5/04 |
| 9,457,941 B2 | 10/2016 | Kawakami | |
| 9,510,699 B1 | 12/2016 | Miller | |
| 9,538,882 B2 | 1/2017 | Parr | |
| 9,730,555 B1 * | 8/2017 | Lee | B65D 43/02 |
| D814,885 S * | 4/2018 | Casey | D7/629 |
| 10,165,884 B1 | 1/2019 | Miller | |
| 10,392,165 B2 | 8/2019 | DeCarlo et al. | |
| D870,521 S * | 12/2019 | Casey | D7/629 |
| 10,716,421 B1 | 7/2020 | Miller | |
| 10,724,253 B1 | 7/2020 | Fries et al. | |
| D945,813 S * | 3/2022 | Zhaobo | D7/354 |
| 11,655,097 B1 * | 5/2023 | Albert | B65D 85/60 |
| | | | 229/120.07 |
| D1,003,119 S * | 10/2023 | Zemel | D7/629 |
| D1,041,264 S * | 9/2024 | Casey | D7/629 |
| D1,048,822 S * | 10/2024 | Casey | D7/611 |
| D1,065,920 S * | 3/2025 | Casey | D7/392.1 |
| 2003/0116572 A1 | 6/2003 | Klock et al. | |
| 2003/0122047 A1 | 7/2003 | Joliey | |
| 2005/0145410 A1 | 7/2005 | Daito | |
| 2006/0076352 A1 | 4/2006 | Peterson et al. | |
| 2006/0225581 A1 * | 10/2006 | Barber | A21C 15/00 |
| | | | 99/426 |
| 2006/0266757 A1 | 11/2006 | Camacho et al. | |
| 2006/0289551 A1 | 12/2006 | Vanhoutte | |
| 2007/0007291 A1 * | 1/2007 | Gunn | B65D 77/046 |
| | | | 220/23.86 |
| 2007/0039973 A1 | 2/2007 | Boenig et al. | |
| 2007/0272088 A1 | 11/2007 | Gomez | |
| 2009/0032545 A1 | 2/2009 | Zeiler et al. | |
| 2009/0255937 A1 * | 10/2009 | Hartz | B65D 25/108 |
| | | | 220/544 |
| 2010/0200583 A1 * | 8/2010 | Curtin | B65D 45/20 |
| | | | 220/666 |
| 2011/0108553 A1 | 5/2011 | Pantelleria | |
| 2013/0071531 A1 * | 3/2013 | Dagan | A47J 47/08 |
| | | | 426/389 |
| 2013/0240552 A1 | 9/2013 | Thomas | |
| 2015/0053676 A1 | 2/2015 | Sand | |
| 2015/0210464 A1 | 7/2015 | Carroll et al. | |
| 2016/0021915 A1 | 1/2016 | Baxter | |
| 2016/0249768 A1 | 9/2016 | Casey et al. | |
| 2018/0002078 A1 | 1/2018 | Quinn | |
| 2019/0106270 A1 | 4/2019 | Phillips et al. | |
| 2022/0160170 A1 | 5/2022 | Casey et al. | |
| 2022/0219867 A1 | 7/2022 | Atshan | |

\* cited by examiner

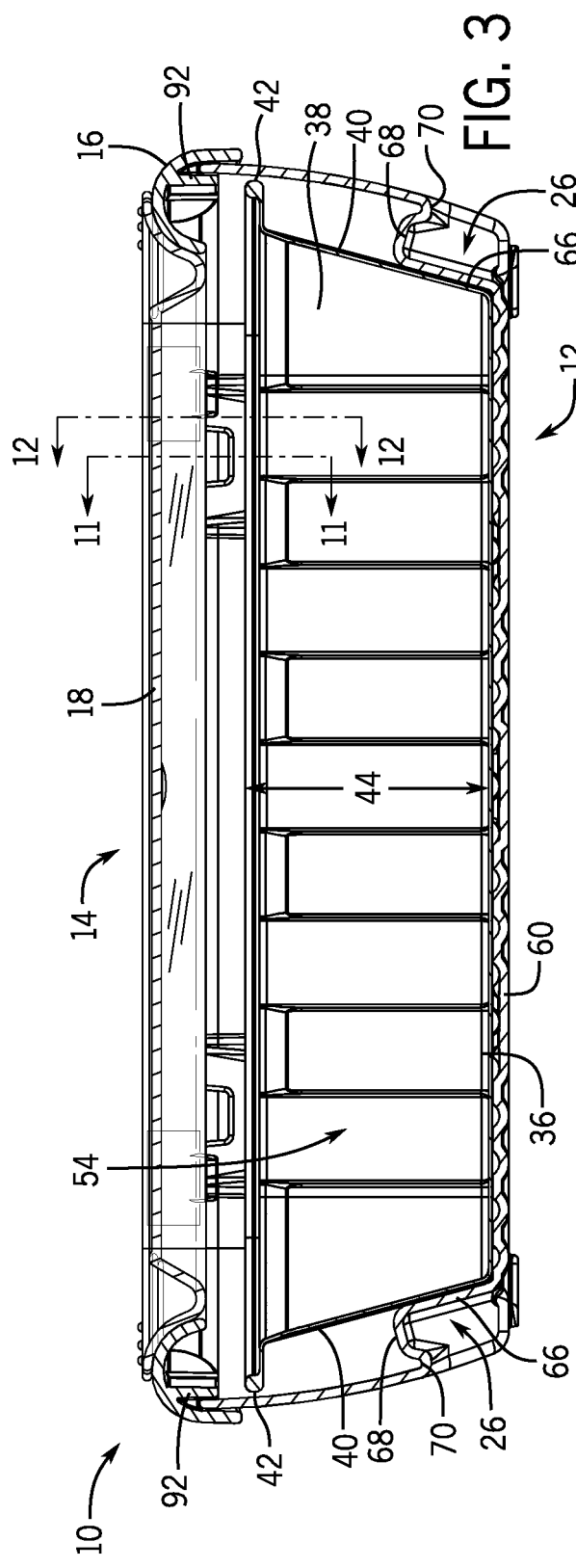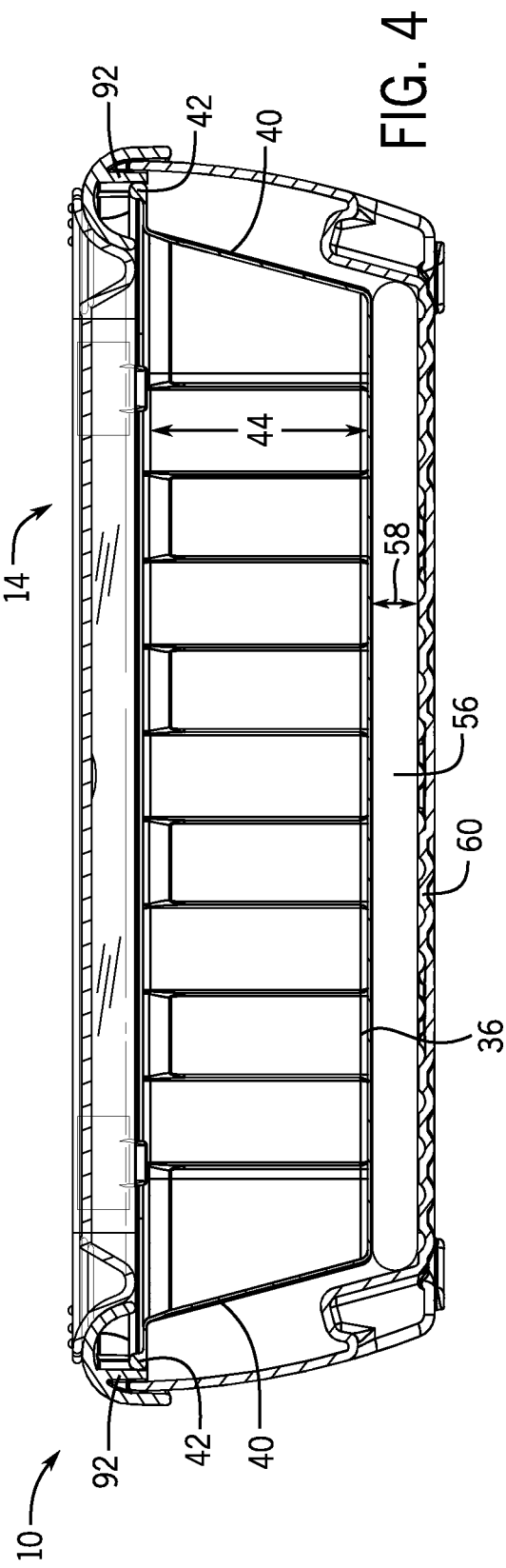

DECORATIVE HOLDER FOR FOODSTUFF TRAYS, TINS, AND PANS

CROSS REFERENCE TO RELATED APPLICATION

This application is a continuation of U.S. patent application Ser. No. 17/104,920, filed Nov. 25, 2020, the contents of which is hereby incorporated by reference in its entirety.

FIELD

The present disclosure relates generally to the field of baking and serving containers. More specifically, the present disclosure relates to decorative and protective holders for cookware and foodstuff trays.

BACKGROUND

U.S. Patent Publication No. 2016/0249768 discloses a decorative holder for serving/catering trays and tins that includes a bottom holder/receptacle which receives a traditional foil serving tin, effectively surrounding the bottom and four sides of the serving tin. A lid is placed over the upper peripheral edges of the holder/receptacle to hold the serving tin in place and also to cover the upper edges of the serving or catering tin. An optional spacer block may be utilized between the bottom of the holder/receptacle and the serving tin so as to align the upper edges of each.

The above patent publication is hereby incorporated by reference in its entirety.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one implementation of the present disclosure, a decorative holder for foodstuff trays, tins, and pans is provided. The decorative holder includes a receptacle having a partially corrugated bottom wall, a pair of opposing side walls, and a pair of opposing end walls. The side walls and the end walls extend upwardly from an outer periphery of the partially corrugated bottom wall and terminate in a top edge. The decorative holder further includes a lid that is hingably coupled to the top edge of the receptacle and configured to pivot between an opened position and a closed position, the lid defining a central opening providing access to an interior region of the decorative holder when disposed atop the receptacle. The receptacle and the lid are configured to hold and generally encapsulate a foodstuff tray, tin, or pan therebetween.

According to another implementation of the present disclosure, a decorative holder for foodstuff trays, tins, and pans is provided. The decorative holder includes a receptacle having a bottom wall, a pair of opposing side walls, and a pair of opposing end walls. The side walls and the end walls extend upwardly from an outer periphery of the bottom wall and terminate in a top edge. The decorative holder further includes a lid that is hingably coupled to the top edge of the receptacle and configured to pivot between an opened position and a closed position, the lid defining a central opening providing access to an interior region of the decorative holder when disposed atop the receptacle. The receptacle and the lid are configured to hold and generally encapsulate a foodstuff tray, tin, or pan therebetween. The receptacle further comprises a pair of handle recesses formed therein, the pair of handle recesses extending into the interior region of the decorative holder.

According to yet another implementation of the present disclosure, a decorative holder for foodstuff trays, tins, and pans is provided. The decorative holder includes a receptacle having a bottom wall, a pair of opposing side walls, and a pair of opposing end walls. The side walls and the end walls extend upwardly from an outer periphery of the bottom wall and terminate in a top edge. The decorative holder further includes a lid that is hingably coupled to the top edge of the receptacle using multiple living hinge clips, The lid is configured to pivot between an opened position and a closed position and the lid defines a central opening providing access to an interior region of the decorative holder when disposed atop the receptacle. The receptacle and the lid are configured to hold and generally encapsulate one or more foodstuff trays, tins, or pans therebetween. One of the pair of opposing side walls further comprises multiple hinge clip recesses that extend into the interior region of the decorative holder and are configured to couple to the living hinge clips such that the living hinge clips fit over at least a portion of the top edge.

BRIEF DESCRIPTION OF THE DRAWINGS

The present disclosure is described with reference to the following Figures. The same numbers are used throughout the Figures to reference like features and like components.

FIG. 3 is a front cross-sectional view of the decorative holder assembly of FIG. 1 in the closed position.

FIG. 4 is a front cross-sectional view of the decorative holder assembly of FIG. 1 in the closed position in an alternative configuration.

DETAILED DESCRIPTION

In the present description, certain terms have been used for brevity, clearness and understanding. No unnecessary limitations are to be inferred therefrom beyond the requirement of the prior art because such terms are used for descriptive purposes only and are intended to be broadly construed.

Figure 1:
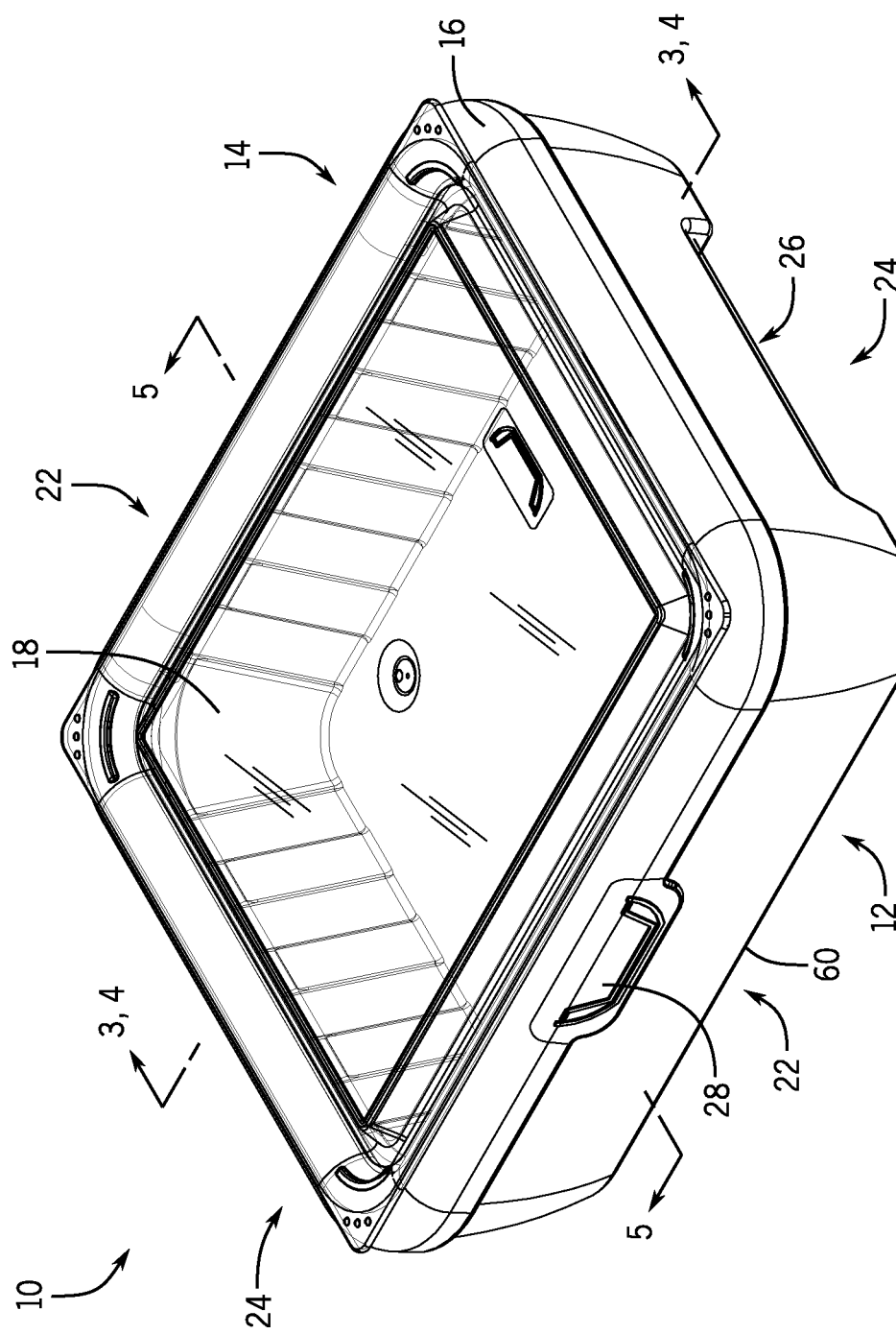
FIG. 1 is a perspective view of a decorative holder assembly in a closed position.
Figure 2:
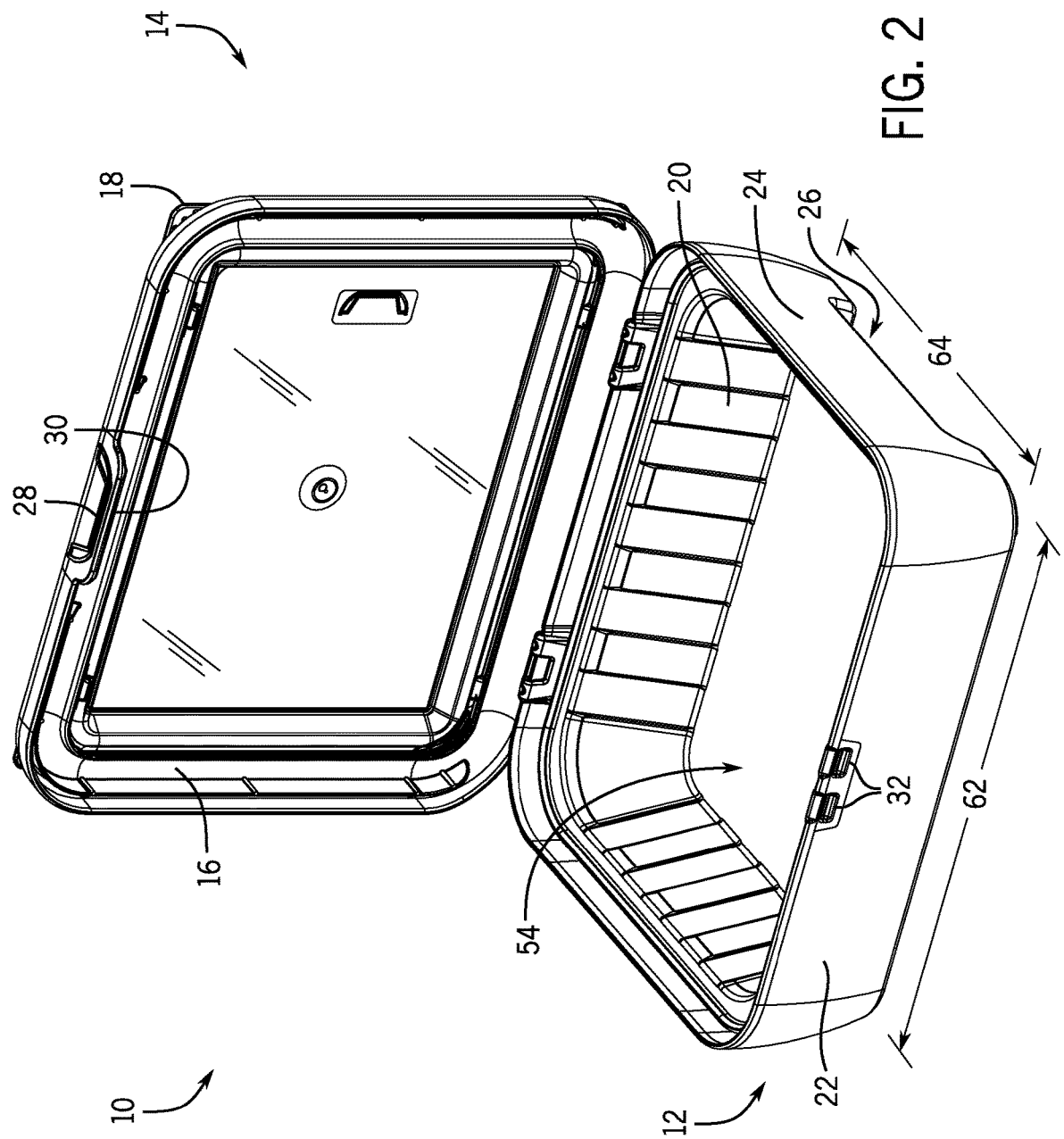
FIG. 2 is a perspective of the decorative holder assembly of FIG. 1 in an opened position.

FIGS. 1 and 2 depict perspective views of a decorative holder assembly 10 in accordance with an exemplary preferred implementation of the present disclosure. In general, the decorative holder assembly 10 includes a receptacle 12 and a lid assembly 14 that is detachably coupled to the receptacle 12. The lid assembly 14 includes a lid 16 and a cover 18. In an exemplary implementation, the cover 18 is detachably coupled to the lid 16 using a snap fit assembly process. As desired, the cover 18 can be coupled and decoupled from the lid 16 to block or permit access to a central opening 54 formed between the receptacle 12 and the lid assembly 14.

The receptacle 12 is shown to include a pair of opposing side walls 22 and a pair of opposing end walls 24. Each of the side walls 22 and end walls 24 extends upwardly from a bottom wall 60 of the receptacle 12. Further details of the features of the bottom wall 60 are included below with reference to FIGS. 3, 4, and 6-8. In an exemplary implementation, a length 62 of the side walls 22 exceeds a length 64 of the end walls 24 such that the receptacle 12 has a generally rectangular shape. In other implementations, the lengths 62, 64 of the side walls 22 and end walls 24 may be identical such that the receptacle 12 has a square shape.

The lid assembly 14 is hingably coupled to the receptacle 12 such that the lid assembly 14 is pivotable between a closed position (depicted in FIG. 1) and an opened position (depicted in FIG. 2). Further details regarding the hinge features of the lid 16 and the coupling of the lid assembly 14 and the receptacle 12 are included below with reference to FIGS. 11 and 12. To pivot the lid assembly 14 from the closed position to the opened position, a user may grip a latch extension portion 28 incorporated into the lid 16, unseating one or more latch protrusions 30 formed on the underside of the latch extension portion 28 from a mated position within one or more latch recesses 32 formed in one of the side walls 22 of the receptacle 12. Once the latch protrusions 30 have been unseated from the latch recesses 32, the user may rotate the lid assembly 14 upwardly, exposing the central opening 54. In some implementations, the latch extension portion 28 may be branded with a logo or other decorative features.

A pan 20 is shown to be encapsulated between the receptacle 12 and the lid assembly 14 within the central opening 54. In an exemplary implementation, the pan 20 is a disposable foil pan used for cooking, transporting, and serving a foodstuff. Although cost-effective and convenient, the present inventors have recognized that disposable foil pans are flimsy and susceptible to damage during transport. In addition, foil pans are unattractive and may cause a food served from a foil pan to be less appetizing than a food served from a more attractive vessel. Accordingly, the present inventors have provided a sturdy and attractive decorative holder assembly that remedies these problems as well as additional problems described below.

As shown in FIGS. 3 and 4, pan 20 is shown to include a bottom wall 36, with a pair of opposing pan side walls 38 and a pair of opposing pan end walls 40 extending upwardly therefrom. The pan side walls and end walls 38, 40 may terminate in a continuous outwardly extending lip 42. The dimensions of the pan 20 may generally conform to a 9 inch wide by 13 inch long cooking pan standard, with a pan height 44 extending from the bottom wall 36 to the lip 42 of approximately 1.5 to 2.5 inches. In other implementations, a differently sized pan 20 may be utilized (e.g., an 8 inch by 8 inch pan, a 9 inch by 9 inch pan).

In still further implementations, a rigid non-disposable foodstuff pan 20 may be utilized instead of a disposable foil pan. In still further implementations, a foodstuff tray (e.g., foodstuff tray 302, depicted in FIG. 18) may be encapsulated between the receptacle 12 and the lid assembly 14. An example of the decorative holder assembly 10 in a food tray configuration is described below with reference to FIG. 17.

Still referring to FIGS. 1-4, the receptacle 12 is further shown to include a handle recess 26 formed in each of the receptacle end walls 24. Advantageously, the handle recesses 26 permit a user to insert their fingers within the recesses 26 on the decorative holder assembly 10 for transport purposes. As best shown in the front cross-sectional views of FIGS. 3 and 4, the handle recesses 26 extend inwardly into the central opening 54, thus providing the receptacle 12 with an attractive and sleek appearance not achievable through outwardly extending handles. Each handle recess 26 is defined by an upwardly extending and outwardly sloping handle wall portion 66 as well as a grip wall portion 68 that slopes downwardly from the handle wall portion 66 and terminates in an outer lip 70. In various implementations, the dimensions of the wall portions 66, 68 and the outer lip 70 may vary to form larger or smaller recesses 26, or the recesses 26 may be formed in a different location on the receptacle 12 (e.g., the side walls 22). In an exemplary implementation, the handle wall portion 66 slopes outwardly from the bottom wall 60 and generally matches the profile of the end walls 40 of the pan 20 such that the pan 20 rests against the handle wall portions 66 (depicted in FIG. 3). By matching the profile of the handle wall portion 66 to the end walls 40, lateral movement of the pan 20 relative to the receptacle 12 is prevented and a risk of spillage of food contained within the pan 20 during transport of the decorative holder assembly 10 is minimized.

Figure 5:
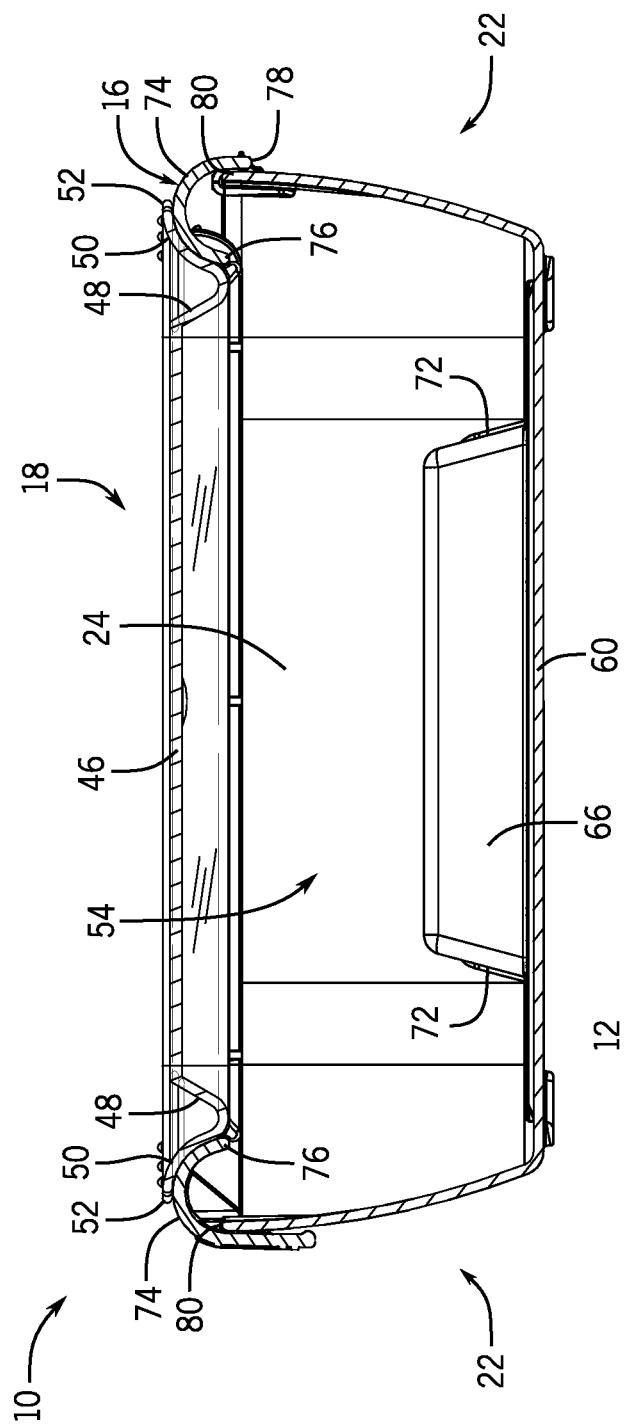
FIG. 5 is a side cross-sectional view of the decorative holder assembly of FIG. 1 in the closed position.

In operation, a user may position their hands such that one or more of their fingertips rest against the grip wall portion 68 and the outer lip 70, thus providing a secure and non-slip hold on the receptacle 12. In some implementations, certain regions of the handle recesses 26 may be textured to improve the user's grip. As best depicted in FIG. 5 (which omits the pan 20), each handle recess 26 is bound by inwardly sloping handle end wall portions 72. The end wall portions 72 may be inclined, that is, non-orthogonal to the bottom wall 60 of the receptacle 12. By utilizing non-orthogonal orientations for the handle wall and end wall portions 66, 72, easier fabrication of the receptacle 12 is achieved. In some implementations, the handle recesses 26 are not bound by the end wall portions 72, and the recesses 26 may extend the entire length 64 (see FIG. 2) of the end walls 24.

In an exemplary implementation, both the receptacle 12 and the lid 16 are fabricated from polypropylene, while the cover 18 is fabricated from transparent styrene-acrylonitrile resin (SAN). In other implementations, each of the receptacle 12, lid 16, and cover 18 may be fabricated from polymethyl methacrylate (PMMA), polyethylene terephthalate (PET), polycarbonate (PC), clarified polypropylene (PP), Plexiglass, Tritan, Kostrate Edge, EdgeGlass, or an alloy blend of various polymer materials. The material may be selected based on the intended use of the decorative holder assembly 10. For example, PC or Tritan may be selected for their low temperature resiliency and crack resistance if the decorative holder assembly 10 is expected to be subjected to freezing temperatures or high drop impacts. Each of the receptacle 12, lid 16, and cover 18 may be fabricated using an injection molding process. The present inventors have recognized that injection molding results in a high quality detailed part at a low cost per part. In other implementations, a different fabrication process may be utilized, including, but not limited to, vacuum forming, blow molding, and rapid production.

Referring now specifically to FIG. 4, an additional configuration of the decorative holder assembly 10 is shown to include a cooling pack component 56 disposed between the bottom wall 60 of the receptacle 12 and the bottom wall 36 of the pan 20. The cooling pack component 56 may be any suitable type of rigid or flexible ice or gel cooling pack that acts to cool the bottom wall 36 of the pan 20 and keep the food contained therein at an optimal temperature for food safety and palatability. In some implementations, due to the shape or flexibility of the cooling pack component 56, portions of the cooling pack component 56 may extend upwardly along one or both of the receptacle side walls and end walls 22, 24 to cool one or both of the pan side walls and end walls 38, 40. A height 58 of the cooling pack component 56 may be controlled in conjunction with the pan height 44 to ensure that adequate clearance is maintained between the outwardly extending lip 42 of the pan 20 and the lid assembly 14. In some implementations, a heating pack component may be utilized in place of the cooling pack component 56, again with the goal of maintaining the food contained in the pan 20 within an optimal temperature range.

As best depicted in the side cross-sectional view of FIG. 5, the cover 18 of the lid assembly 14 is shown to include a generally planar central wall 46 having a surface area that generally corresponds to the surface area of the central opening 54 defined by the lid 16. The central wall 46 is surrounded by a downwardly sloping peripheral wall 48, an upwardly sloping peripheral wall 50, and a horizontal lip 52. The upwardly sloping peripheral wall 50 and the horizontal lip 52 are shown to rest against an outer surface 74 of the lid 16. The outer surface 74 of the lid 16 is generally semicircular and extends from an inner peripheral edge 76 to an outer peripheral edge 78. When the lid assembly 14 is coupled to the receptacle 12, the inner peripheral edge 76 resides within the central opening 54, and the outer peripheral edge 78 is positioned over exterior surfaces of the side walls 22 and end walls 24 of the receptacle 12 and vertically below a peripheral top edge 80 of the receptacle 12.

Figure 6:
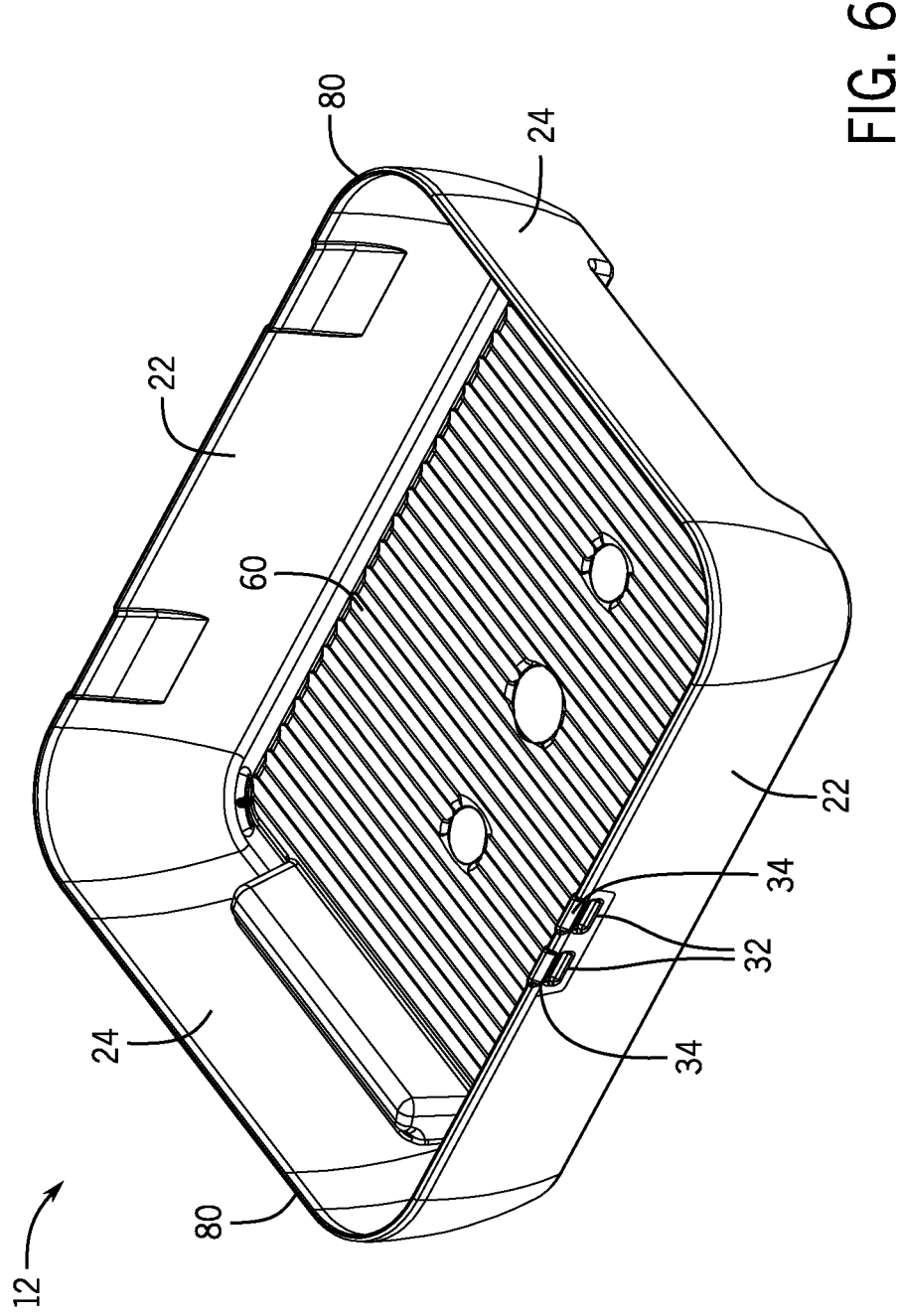
FIG. 6 is a perspective view of a receptacle utilized in the decorative holder assembly of FIG. 1.
Figure 7:
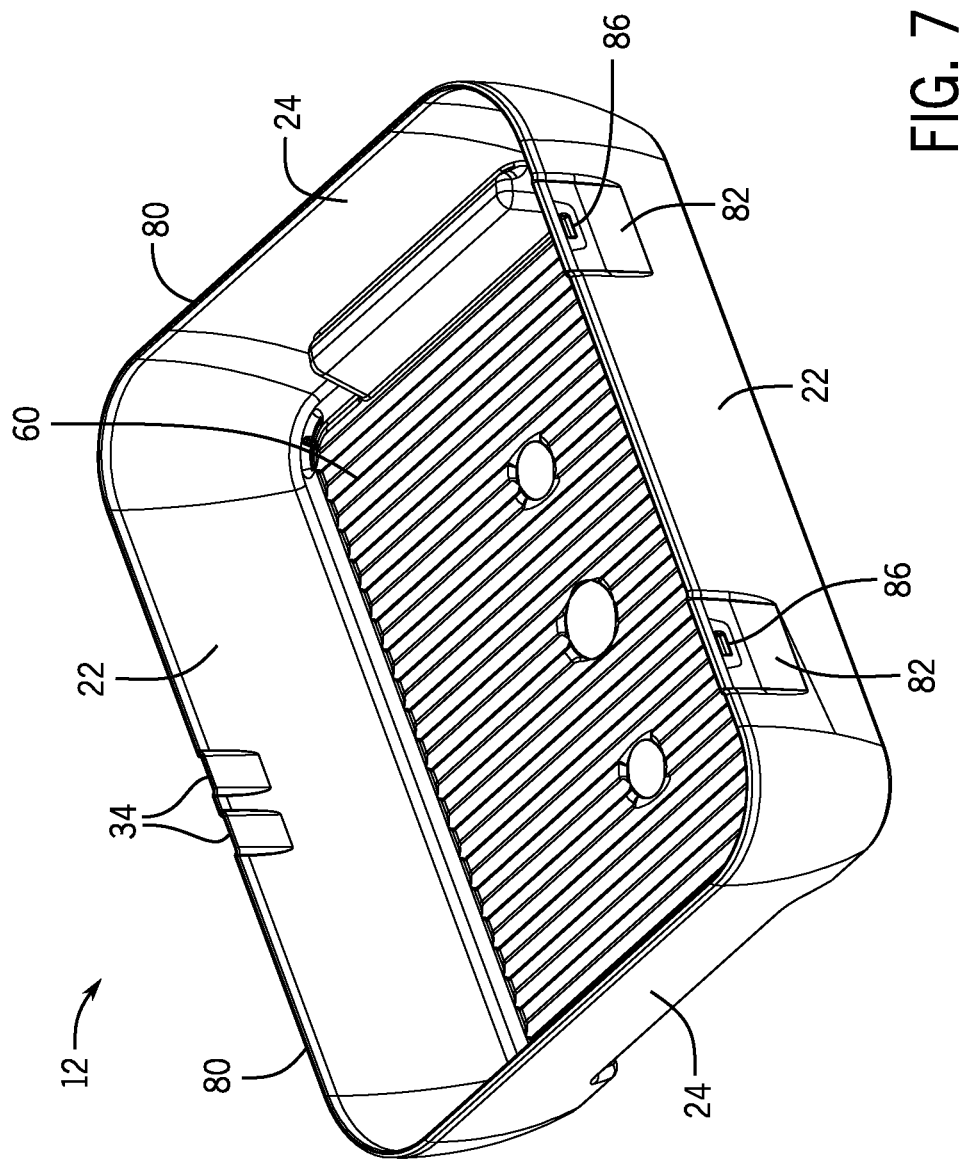
FIG. 7 is another perspective view of the receptacle of FIG. 6.
Figure 8:
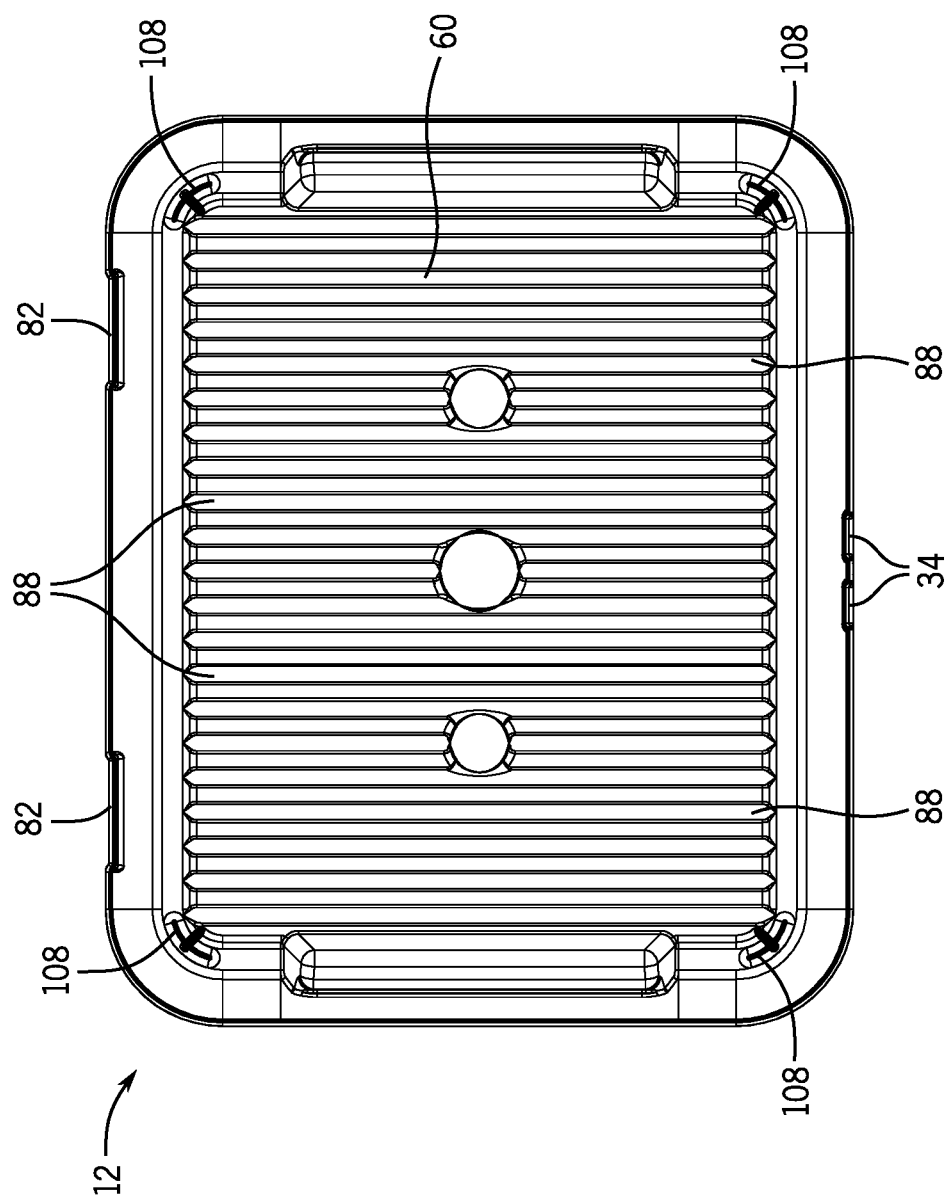
FIG. 8 is a top view of the receptacle of FIG. 6.

The features of the receptacle 12 are further depicted in FIGS. 6-8. Specifically, FIGS. 6 and 7 respectively depict front and rear perspective views of the receptacle 12, while FIG. 8 depicts a top view of the receptacle 12. As noted above, the receptacle 12 includes a pair of opposing side walls 22 and a pair of opposing end walls 24. Each of the side walls 22 and end walls 24 extends upwardly from a periphery of the bottom wall 60, terminating in the top receptacle edge 80. Notably, the side walls 22 and edge walls 24 terminate in the top receptacle edge 80 without the inclusion of any horizontally-extending lip, thus providing the receptacle 12 with a sleek, attractive appearance that permits easy coupling of receptacle 12 to the lid assembly 14.

As noted above, one of the side walls 22 is shown to include multiple latch recesses 32 that are sized and shaped to receive the latch protrusions 30 extending from the latch extension portion 28 of the lid 16 (also depicted in FIG. 10, described below). Mating of the latch protrusions 30 to the latch recesses 32 retains the lid assembly 14 in the closed position. In an exemplary implementation, the latch recesses 32 are positioned just below the top receptacle edge 80, and below one or more latch indicator recesses 34 positioned coincident with the top receptacle edge 80. The latch indicator recesses 34 may act as lead-in features that align the latch protrusions 30 for mating with the latch recesses 32. As the latch protrusions 30 pass over the latch indicator recesses 34, an audible indicator (e.g., a clicking noise) may be emitted due to the interaction of the latch protrusions 30 and the latch indicator recesses 34, signaling the achievement of a successful mate to a user.

Referring now to FIG. 7, the receptacle 12 is shown to include a pair of hinge clip receiving recesses 82 on the sidewall 22 opposing the latch recesses 32 and latch indicator recesses 34. Each hinge clip receiving recess 82 is sized and shaped to couple to a living hinge clip 84 extending from the lid 16 (depicted in FIGS. 11 and 12, described below). In an exemplary implementation, each of the hinge clip receiving recesses 82 further includes a clip indicator recess or notch 86. Similar to the latch indicator recess 34, the clip indicator recess 86 may aid in locating the living hinge clip 84 relative to the hinge clip receiving recess 82, as well as provide audible indication of successful mating between the living hinge clip 84 and the clip receiving recess 82. Although the present figures depict the decorative holder assembly 10 as having a pair of living hinge clips 84 and corresponding hinge clip receiving recesses 82, in other implementations, the decorative holder assembly 10 may include a different number of hingable couplings between the hinge clips 84 and clip receiving recesses 82. For example, if the decorative holder assembly 10 is sized to accommodate a small form factor pan 20, the lid 16 may include only a single hinge clip 84 with a single clip receiving recess 82 on the receptacle 12. Conversely, if the decorative holder assembly 10 is sized to accommodate a large form factor pan 20, the lid 16 may include three or more hinge clips 84 with three or more clip receiving recesses 82 on the receptacle 12.

Turning now to FIG. 8, a top view of the receptacle 12 is depicted. As shown, the bottom wall 60 includes multiple protrusions 88 that result in the bottom wall 60 being generally corrugated or otherwise non-planar. The present inventors have recognized that providing the bottom wall 60 with a corrugated or wave-like surface increases the amount of air permitted to flow underneath the bottom wall 60 when the decorative holder assembly 10 rests on a surface. Advantageously, increasing the amount of airflow underneath the bottom wall 60 insulates and aids in cooling of the foodstuff within the pan 20, particularly when the pan 20 is positioned atop an ice pack 56, as depicted in FIG. 4. The corrugated surface has a pattern of high portions and low portions, and in the depicted example is a wave-like pattern that has channels extending a cross-sectional length or width of the pan 20 or tray in the receptacle 12, thereby allowing air to flow and circulate around and under the pan 20 or tray within the receptacle 12. The pattern of high and low portions also minimizes the surface area of the bottom wall 60 in contact with the pan 20 or the cooling pack component 56, as well as the surface area of the bottom wall 60 in contact with a tabletop or other surface on which the decorative holder assembly 10 may be disposed. This minimization of surface area reduces the heat transfer between the pan 20 and the bottom wall 60, and the bottom wall 60 and the tabletop. In this way, the risk of polymer softening and deformation of the bottom wall 60 due to heat transfer from the pan 20 is minimized. Similarly, the risk of cracking of the bottom wall 60 due to cooling from the cooling pack component 56 is minimized. In some implementations, the corrugated pattern of the bottom wall 60 may be interrupted by one or more flat surfaces (e.g., circular flat surfaces) that aid in the injection molding process. For example, the flat surfaces may correspond to injection molding gate locations, or lift attachment points that permit the receptacle 12 to lifted out of an injection mold cavity using air poppet valves. In an exemplary embodiment, the receptacle 12 is further shown to include tray locating recesses 108 formed in each of the corners of the bottom wall 60. The tray locating recesses 108 may be configured to mate with features of a foodstuff tray (e.g., foodstuff tray 302, depicted in FIGS. 17 and 18).

Figure 9:
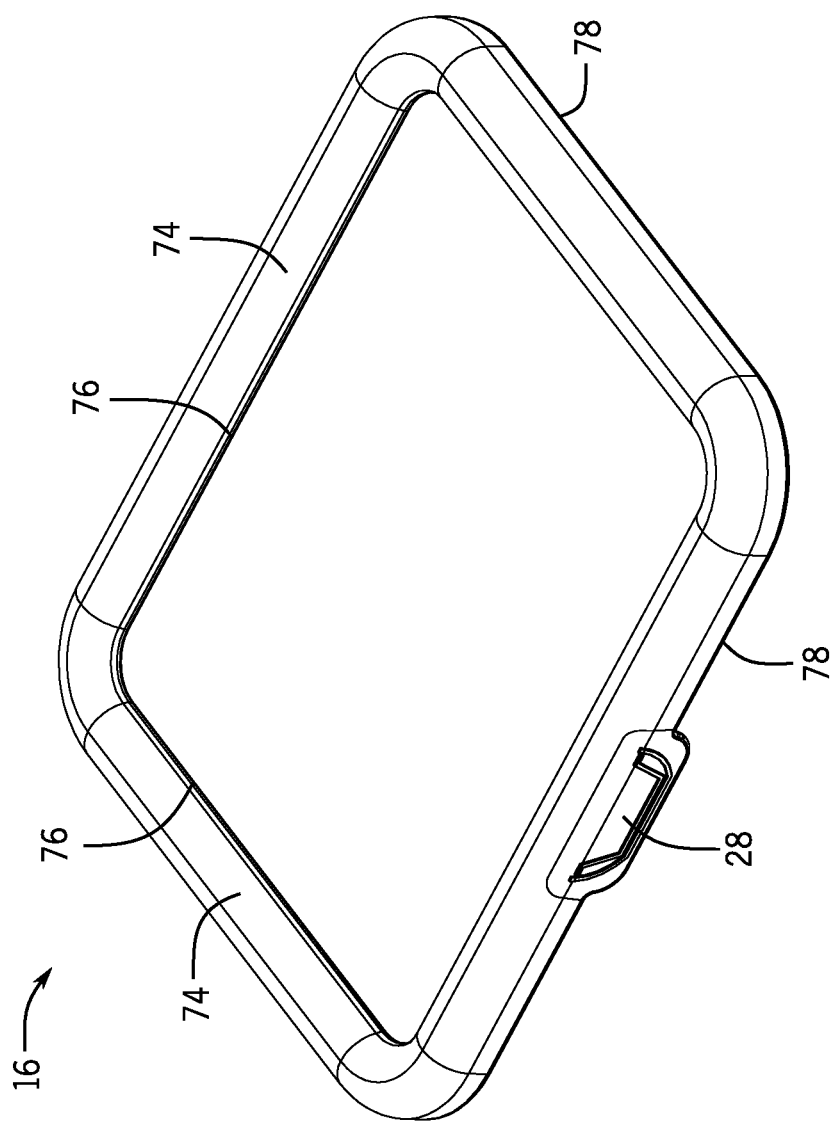
FIG. 9 is a perspective view of a lid utilized in the decorative holder assembly of FIG. 1.
Figure 10:
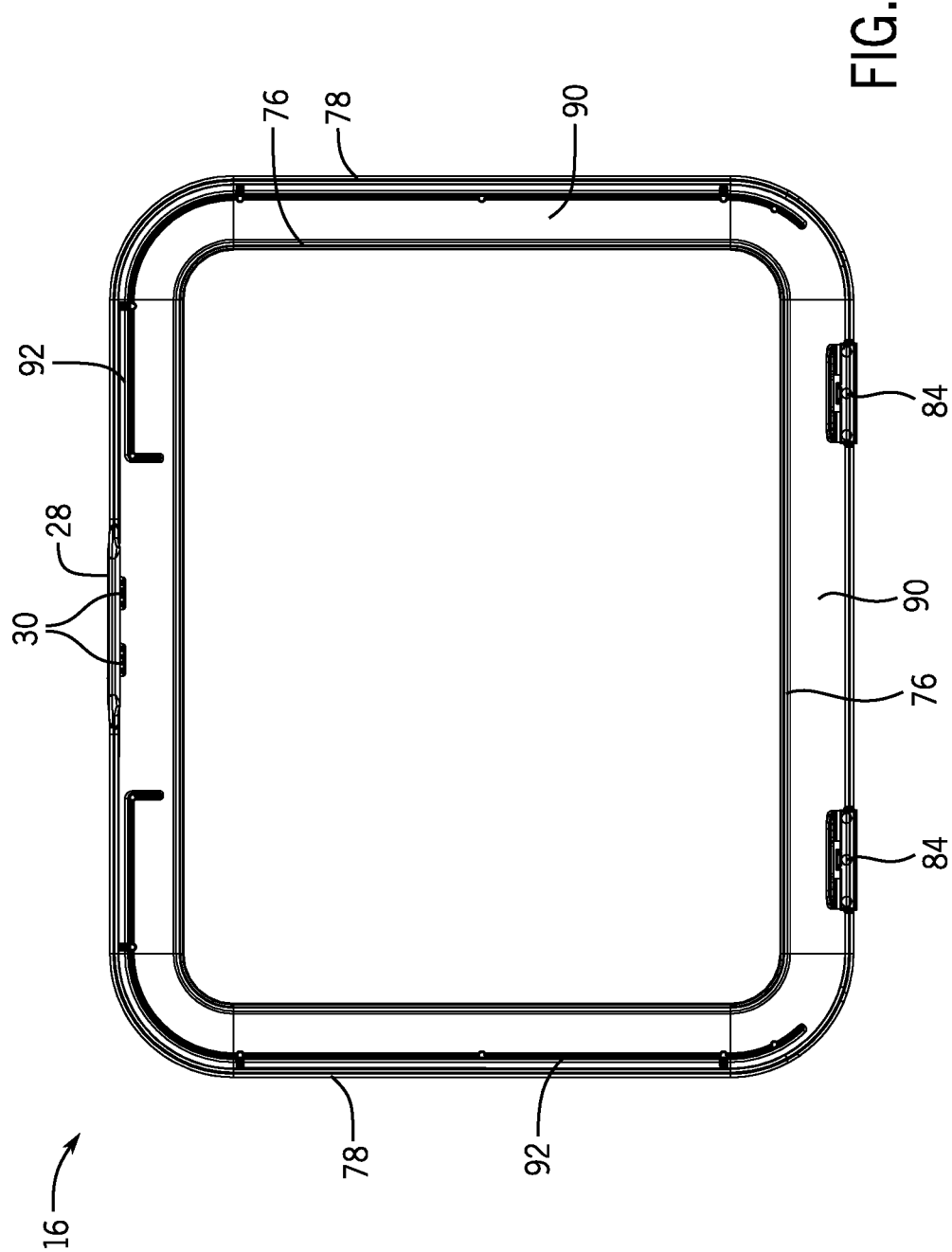
FIG. 10 is a bottom view of the lid of FIG. 9.

Referring now to FIGS. 9 and 10, perspective and bottom views of the lid 16 are shown. As described above, the lid generally consists of an outer surface 74 that extends from an inner peripheral edge 76 to an outer peripheral edge 78. The outer peripheral edge 78 is configured to fit over the top edge 80 of the receptacle 12. As specifically depicted in FIG. 10, latch protrusions 30 located on a latch extension portion 28 are positioned opposite the pair of living hinge clips 84. An inner surface 90 of the lid 16 is also shown to include an inner lip 92 extending at least partially around the inner surface 90 between the inner peripheral edge 76 and the outer peripheral edge 78. When the lid assembly 14 is coupled to the receptacle 12 and pivoted to the closed position, the inner lip 92 may reside just inside the top edge 80 of the receptacle 12, such that the outer peripheral edge 78 and the inner lip 92 form a clip-like mate over the top edge 80 (see FIGS. 3 and 4) of the receptacle 12, thereby minimizing any potential movement of the lid assembly 14 relative to the receptacle 12. As depicted specifically in FIG. 4, in some implementations, the inner lip 92 is positioned outwardly of the pan lip 42. In other implementations, the inner lip 92 may instead be positioned closer to the inner peripheral edge 76 such that the inner lip 92 is positioned inwardly of the pan lip 42 and acts to retain the pan 20.

Figure 12:
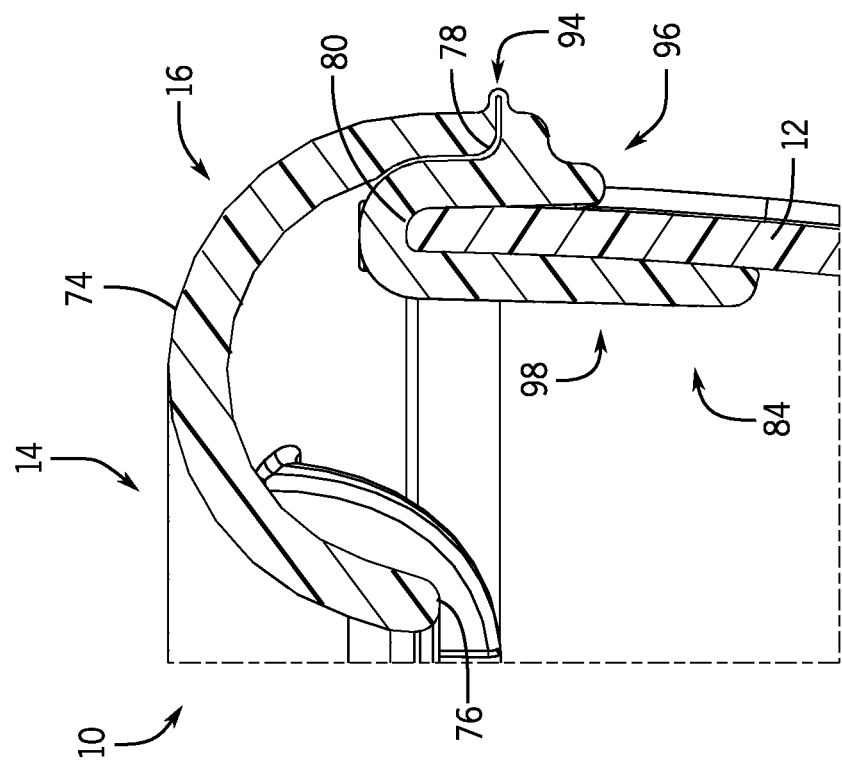
FIG. 12 is a side cross-sectional view of the hinged coupling between the lid and the receptacle taken along the line 12-12 of FIG. 3.
Figure 11:
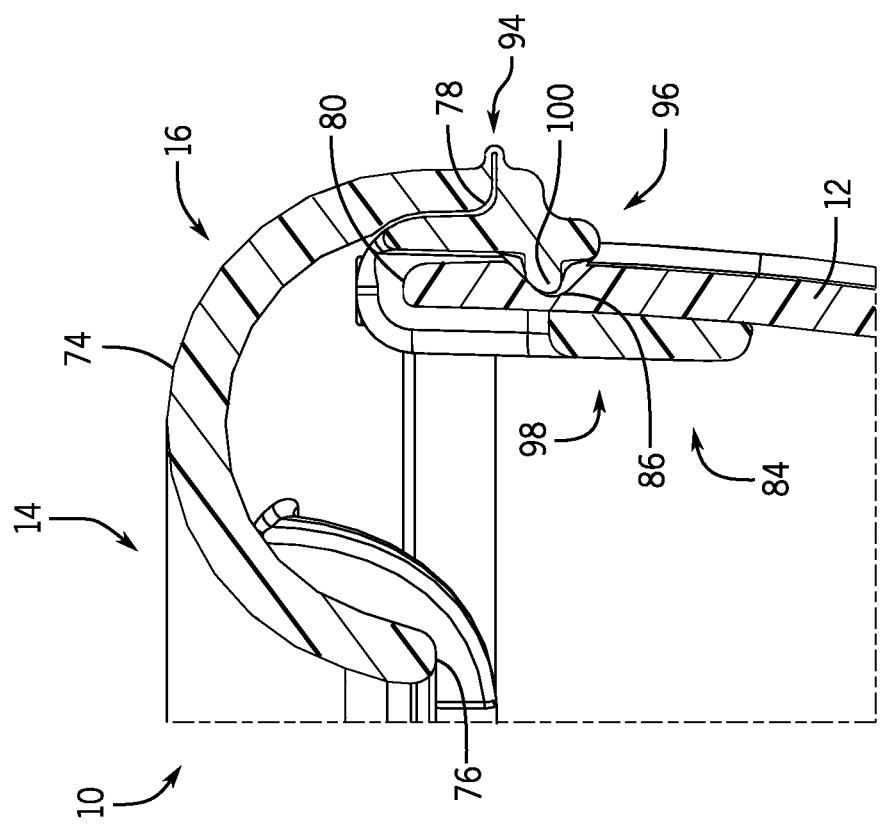
FIG. 11 is a side cross-sectional view of the hinged coupling between the lid and the receptacle taken along the line 11-11 of FIG. 3.

Referring now to FIGS. 11 and 12, side cross-sectional views of coupling of the lid 16 and receptacle 12 are depicted. As shown, the lid 16 includes the living hinge clip 84 extending from the outer peripheral edge 78. Advantageously, use of living hinges permits the lid 16 to be fabricated as a single component, thereby simplifying the bill of materials and assembly of the decorative holder assembly 10.

A living hinge portion 94 of the clip 84 permits the lid assembly 14 to pivot between the closed position and the opened position. Adjacent the living hinge portion 94, each clip 84 includes an exterior clip portion 96 and an interior clip portion 98. Together, the exterior clip portion 96 and the interior clip portion 98 are generally C-shaped to fit over the top edge 80 and into a clip receiving recess 82 formed in the sidewall 22 of the receptacle 12. As specifically depicted in FIG. 11, the exterior clip portion 96 includes a locating protrusion 100 that extends from the exterior clip portion 96 and is configured to fit within the clip indicator recess 86 formed within the receptacle 12. Mating of the locating protrusion 100 with the clip indicator recess 86 may result in an audible indicator (e.g., a clicking or snapping sound) of a successful coupling of the lid 16 to the receptacle 12.

Figure 13:
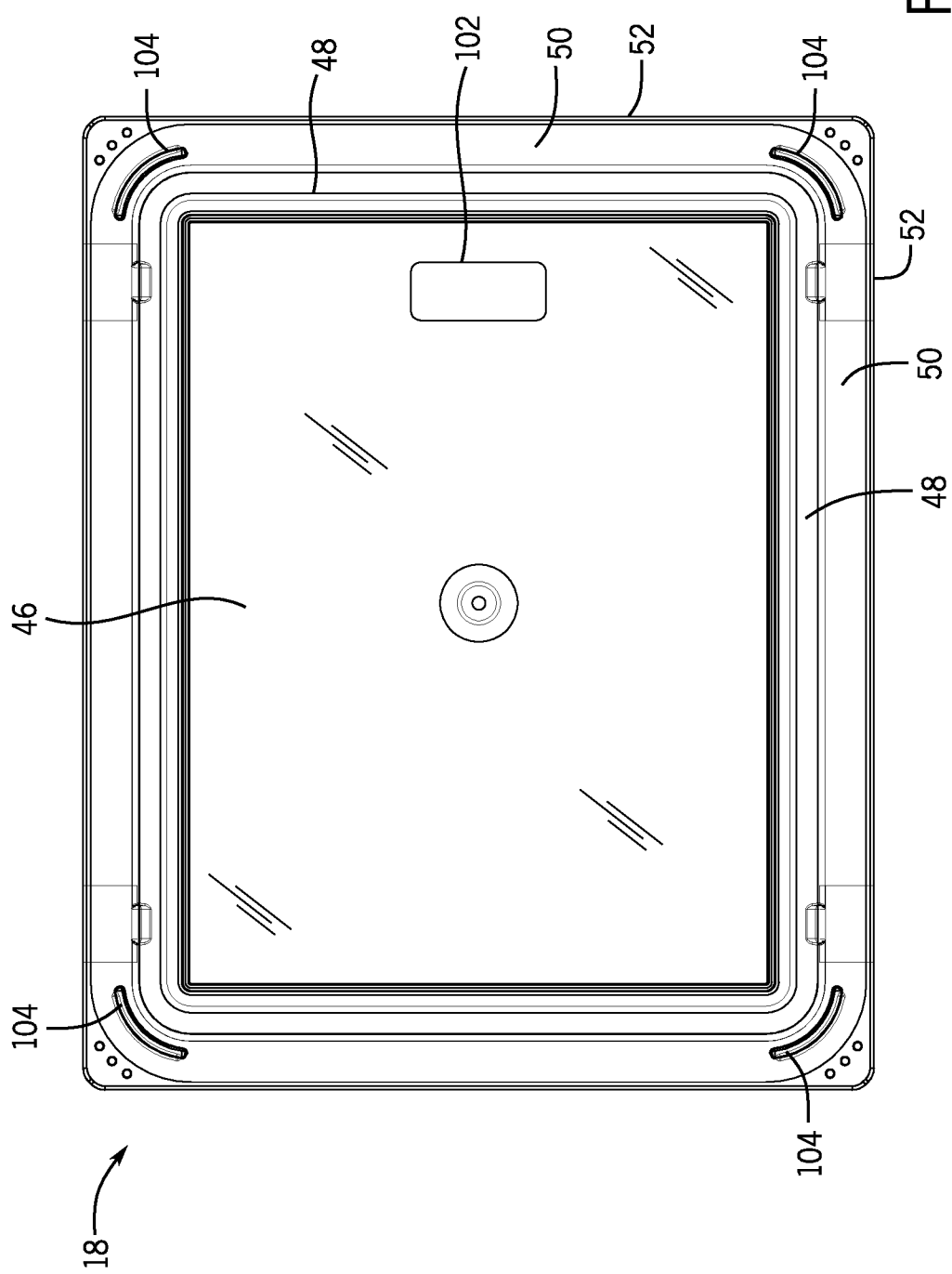
FIG. 13 is a top view of a cover utilized in the decorative holder assembly of FIG. 1.
Figure 14:
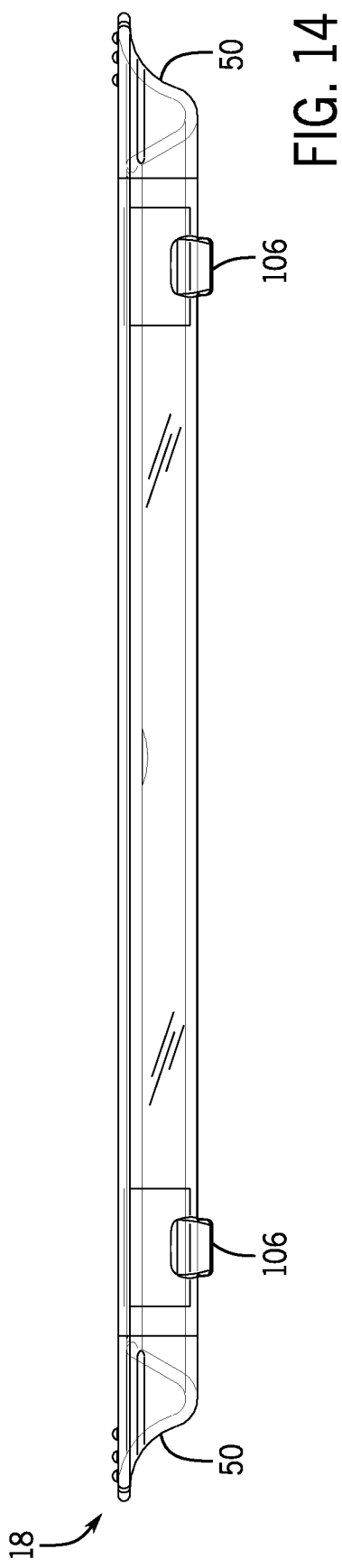
FIG. 14 is a front view of the cover of FIG. 13.
Figure 15:
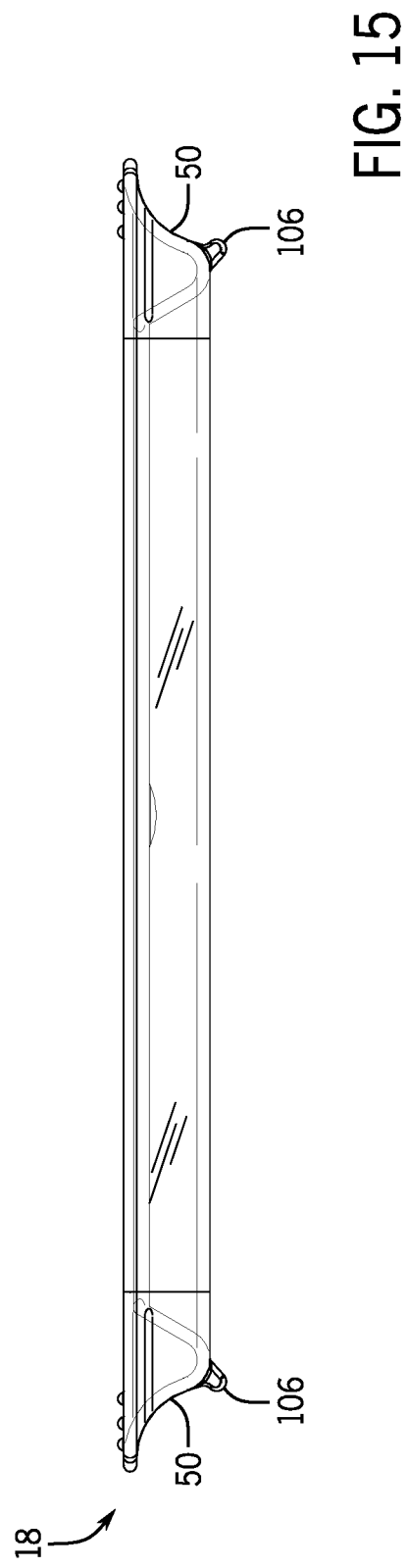
FIG. 15 is a side view of the cover of FIG. 13.

FIGS. 13-15 respectively depict additional top, front, and side views of the cover 18. As described above, the cover 18 may include a central wall 46 surrounded by a downwardly sloping peripheral wall 48, an upwardly sloping peripheral wall 50, and a horizontal lip 52. In some implementations, the central wall 46 includes a defined branding area 102 in which a logo may be formed (e.g., as part of an injection molding process) or affixed (e.g., using a decal). In other implementations, all or a substantial portion of the central wall 46 can be painted, printed or otherwise decorated to provide an attractive appearance to the decorative holder assembly 10.

Figure 16:
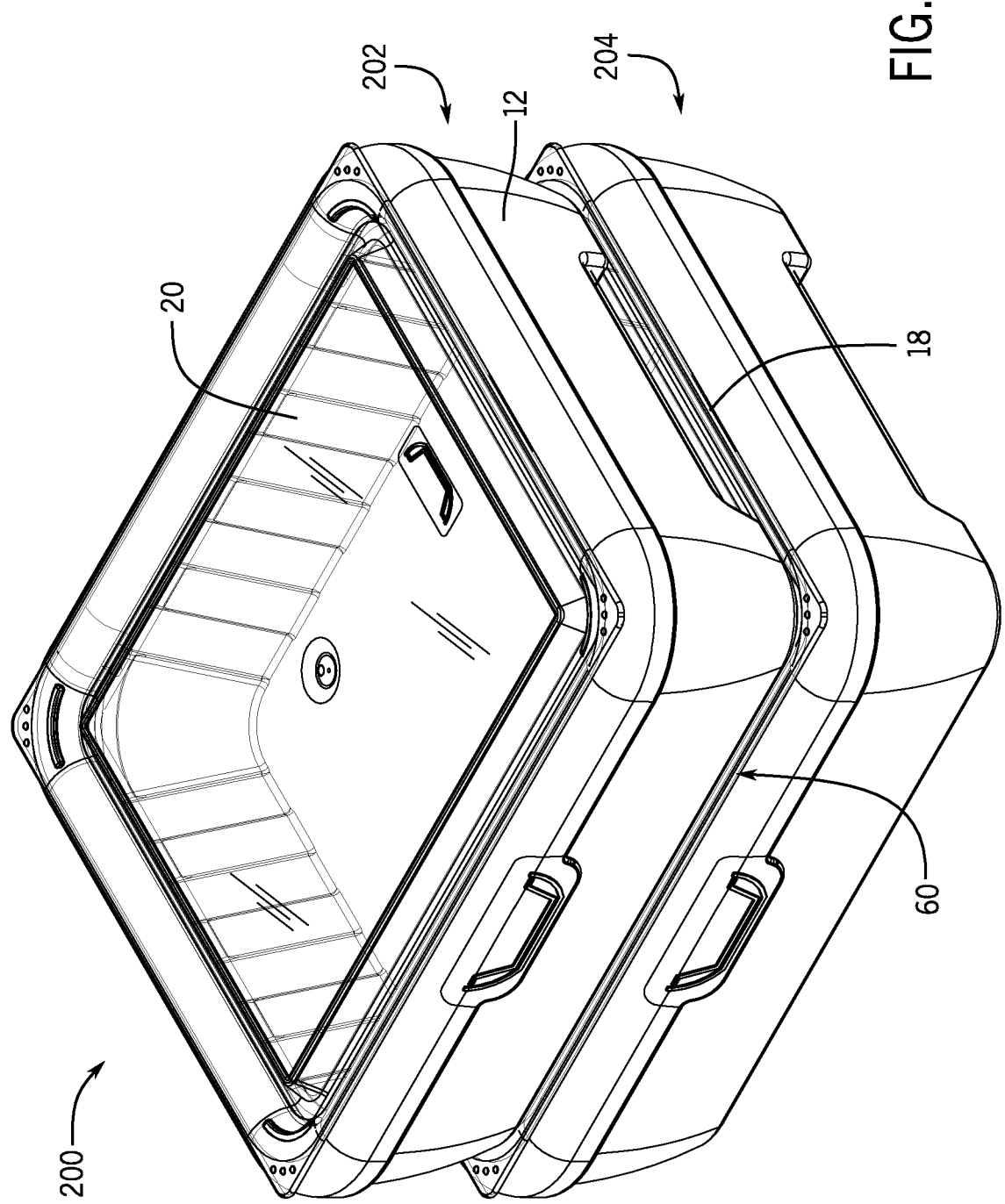
FIG. 16 is a perspective view of multiple decorative holder assemblies in a stacked configuration.

Referring specifically to FIG. 13, the cover 18 is further shown to include stacking protrusions 104 extending inwardly from the upwardly sloping peripheral wall 50, just below the horizontal lip 52. The stacking protrusions 104 may be configured to fit with corresponding features (e.g., interlocking protrusions, recesses) located on the exterior surface of the bottom wall 60 of the receptacle 12 in order to limit relative movement of the receptacle 12 and the cover 18. For example, the cover 18 may be removed from the lid assembly 14 and placed underneath the receptacle 12 in order to provide access to an interior region within the central opening 54 while serving the foodstuff contained within the pan 20. In addition, as depicted in FIG. 16, multiple decorative holder assemblies 10 may be stacked atop each other during transport. As shown, in an exemplary implementation the stacking protrusions 104 are generally arc-shaped, although any desired shape compatible with corresponding features of the receptacle 12 may be utilized.

As best shown in FIGS. 14 and 15, the cover 18 also includes detent prongs or tabs 106 extending outwardly from the upwardly sloping peripheral wall 50. The detent prongs 106 are configured to fit beneath the inner peripheral edge 76 of the lid 16 (depicted in FIG. 5) and act to retain the cover 18 when the cover 18 is coupled to the lid 16 to form the lid assembly 14. In an exemplary implementation, when assembled in the lid assembly 14, the cover 18 includes one pair of detent prongs 106 extending toward a sidewall 22 of the receptacle 12 and an opposing pair of detent prongs 106 facing the opposite sidewall 22. In other implementations, the cover 18 may include a different number of detent prongs 106, in different locations than those depicted in FIGS. 13-15.

FIG. 16 depicts multiple decorative holder assemblies in a stacked configuration 200, with an upper decorative holder assembly 202 disposed atop a lower decorative holder assembly 204. Each of the upper and lower decorative holder assemblies 202, 204 may be identical or substantially similar to the decorative holder assembly 10 depicted and described above with reference to FIGS. 1-15. The present inventors have recognized that transport of aluminum pans 20 to potlucks, events, or the like often involves the need to transport multiple foodstuff pans 20 at once. Accordingly, the bottom wall 60 of the receptacle 12 on the upper decorative holder assembly 202 is configured to fit with the cover 18 of the lower decorative holder assembly 204 to minimize slip between the assemblies 202, 204 and prevent spillage of foodstuff contained therein.

Figure 17:
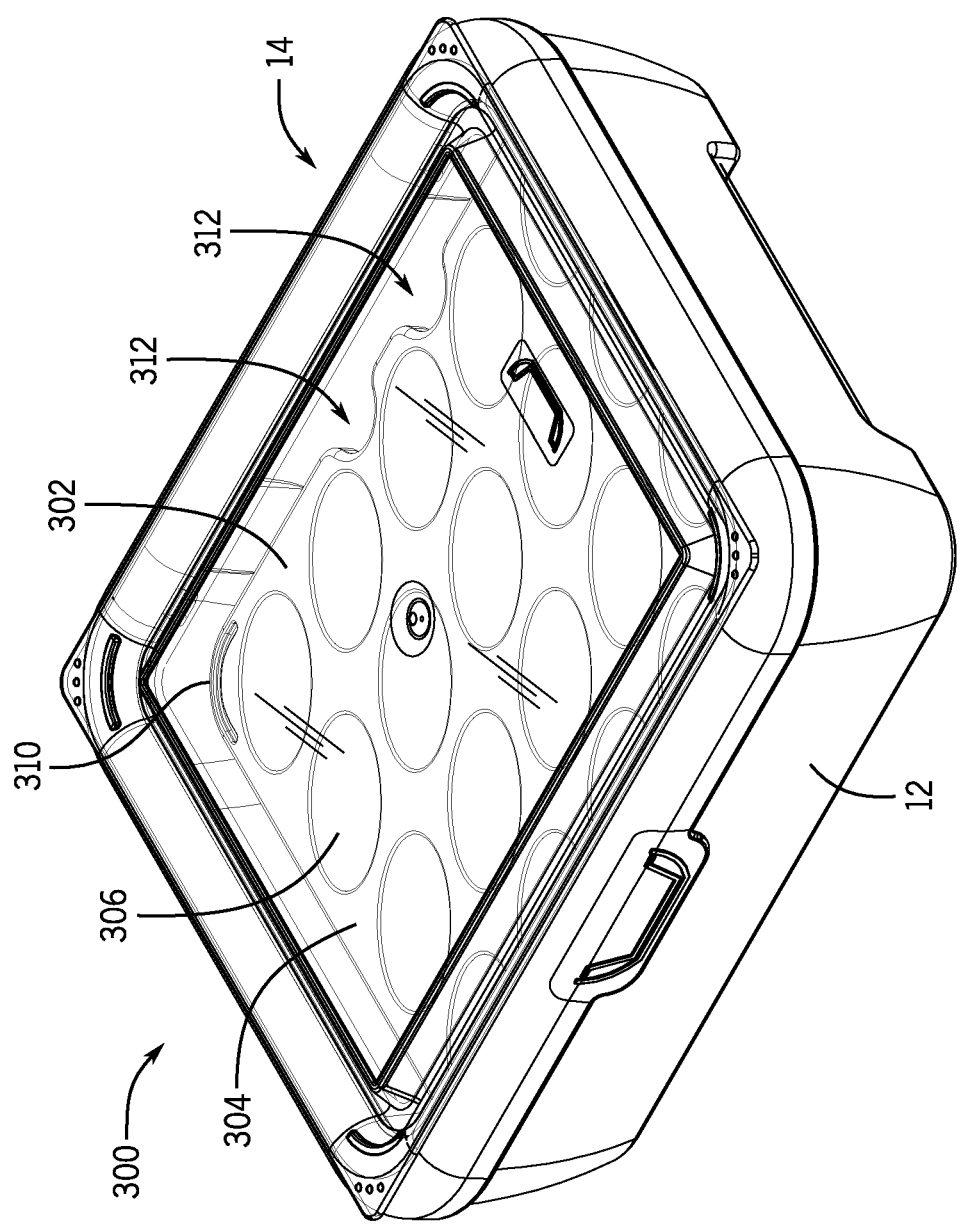
FIG. 17 is a perspective view of a decorative holder assembly in an alternative foodstuff configuration featuring a foodstuff tray.

FIG. 17 depicts a decorative holder assembly 300 in a foodstuff tray configuration. Certain components of the decorative holder assembly 300 may be identical or substantially similar to the components of the decorative holder assembly 10, depicted and described above with reference to FIGS. 1-15. For example, the receptacle 12 and the lid assembly 14 may be identical in both the decorative holder assemblies 10 and 200. However, in contrast to the decorative holder assembly 10, the decorative holder assembly 300 may include a foodstuff tray 302 encapsulated between the receptacle 12 and the lid assembly 14.

Figure 18:
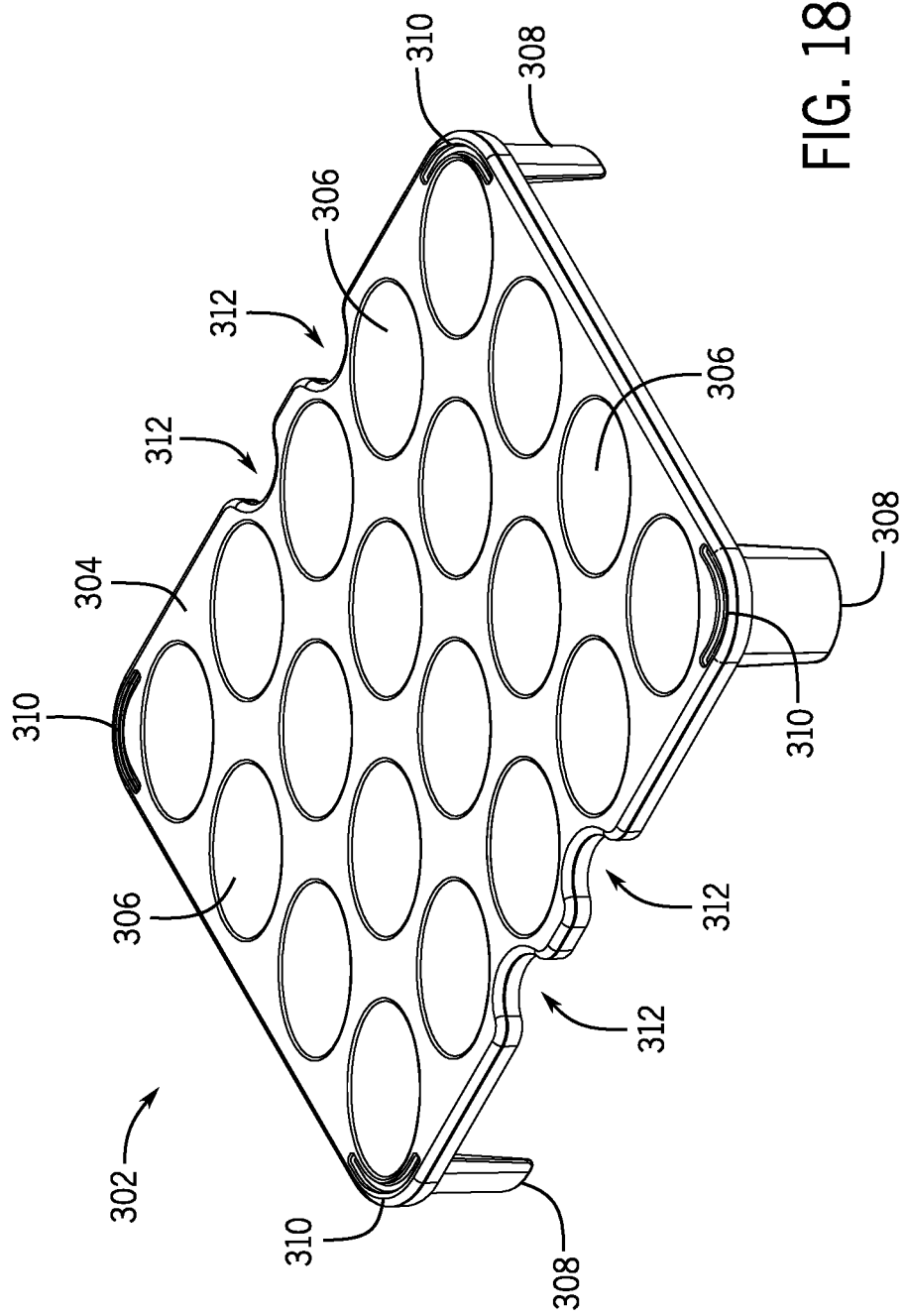
FIG. 18 is a perspective view of the foodstuff tray of FIG. 17.

FIG. 18 depicts a perspective view of the foodstuff tray 302. As shown, the foodstuff tray 302 includes a generally planar supporting wall 304 with multiple foodstuff indentations 306 formed therein. The supporting wall 304 may substantially correspond to the size and shape (e.g., generally rectangular, generally square) of the receptacle 12. The indentations 306 may be formed in a regular pattern in the supporting wall 304 such that food items placed within the indentations 306 are separated from each other and aesthetic damage to the foods items is prevented during transport and serving of the food items. Although each of the indentations 306 depicted in FIGS. 17 and 18 is depicted as having an oval shape that is well-suited for supporting eggs and other egg-shaped foods, in other implementations, the indentations 306 may have any other shape required to support a desired food item (e.g., circular shapes suitable for supporting cupcakes). In still further implementations, rather than solid indentations, the supporting wall 304 may be formed with multiple holes of any desired shape suitable to receive and support a desired food item.

Multiple legs 308 are shown to extend downwardly from the supporting wall 304. In an exemplary implementation, the foodstuff tray 302 includes four legs 308, with one leg 308 positioned at each of the corners of the supporting wall 304. In other implementations, the foodstuff tray 302 may include a greater or fewer number of legs 308, or legs 308 positioned differently relative to the supporting wall 304. The height of each of the legs 308 may correspond to the food items intended to be supported by the indentations 306, as well as the intended purpose of the decorative holder assembly 300. For example, if the legs 308 are too long, there may be insufficient clearance for the food items when the lid assembly 14 is pivoted to a closed position, as depicted in FIG. 17. Each of the legs 308 may be generally arc-shaped, corresponding to arc-shaped corner recesses 310 formed in the supporting wall 304, as well as the tray locating recesses 108 formed in the receptacle 12 (depicted in FIG. 8). The corner recesses 310 may permit multiple foodstuff trays 302 to be stacked atop each other and encapsulated within the receptacle 12 and lid assembly 14.

The supporting wall 304 is further shown to include grab recesses 312 formed therein. In an exemplary implementation, the supporting wall 304 includes a pair of opposing grab recesses 312 facing the side walls 22 of the receptacle 12, although in other implementations, the grab recesses 312 may face the end walls 24 of the receptacle 12. The grab recesses 312 may be any shape or size required to permit a user to insert their fingers within the grab recesses 312 and underneath the supporting 304 without damaging the food items placed within the indentations 306.

The foodstuff tray 302 may be fabricated from any material suitable for the food items intended to be supported by the foodstuff tray 302. In an exemplary implementation, the foodstuff tray 302 is fabricated from the same material at the receptacle 12 and the lid 16 (e.g., polypropylene).

Figure 19:
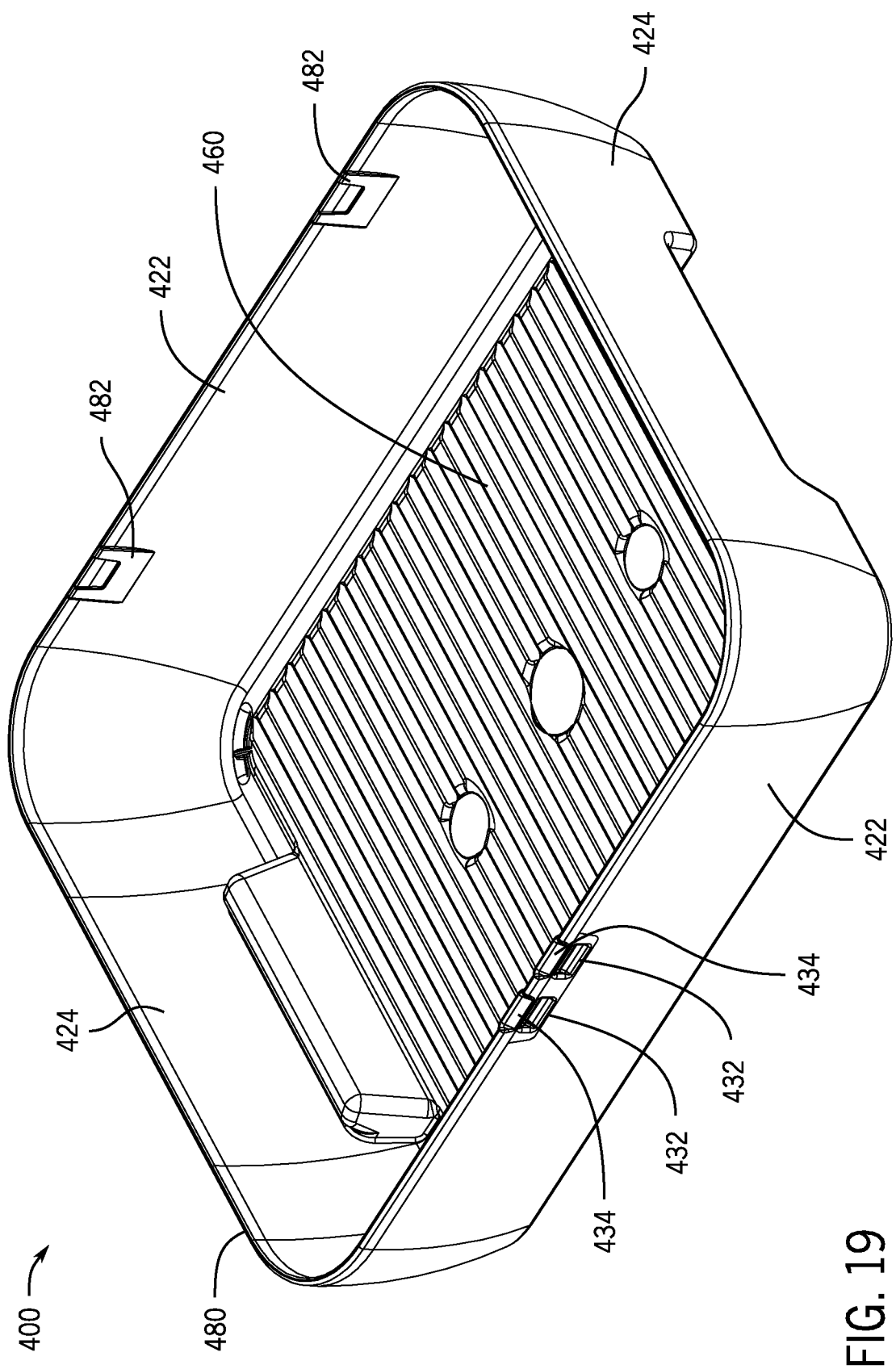
FIG. 19 is a perspective view of another receptacle that may be utilized in the decorative holder assembly of FIG. 1.
Figure 20:
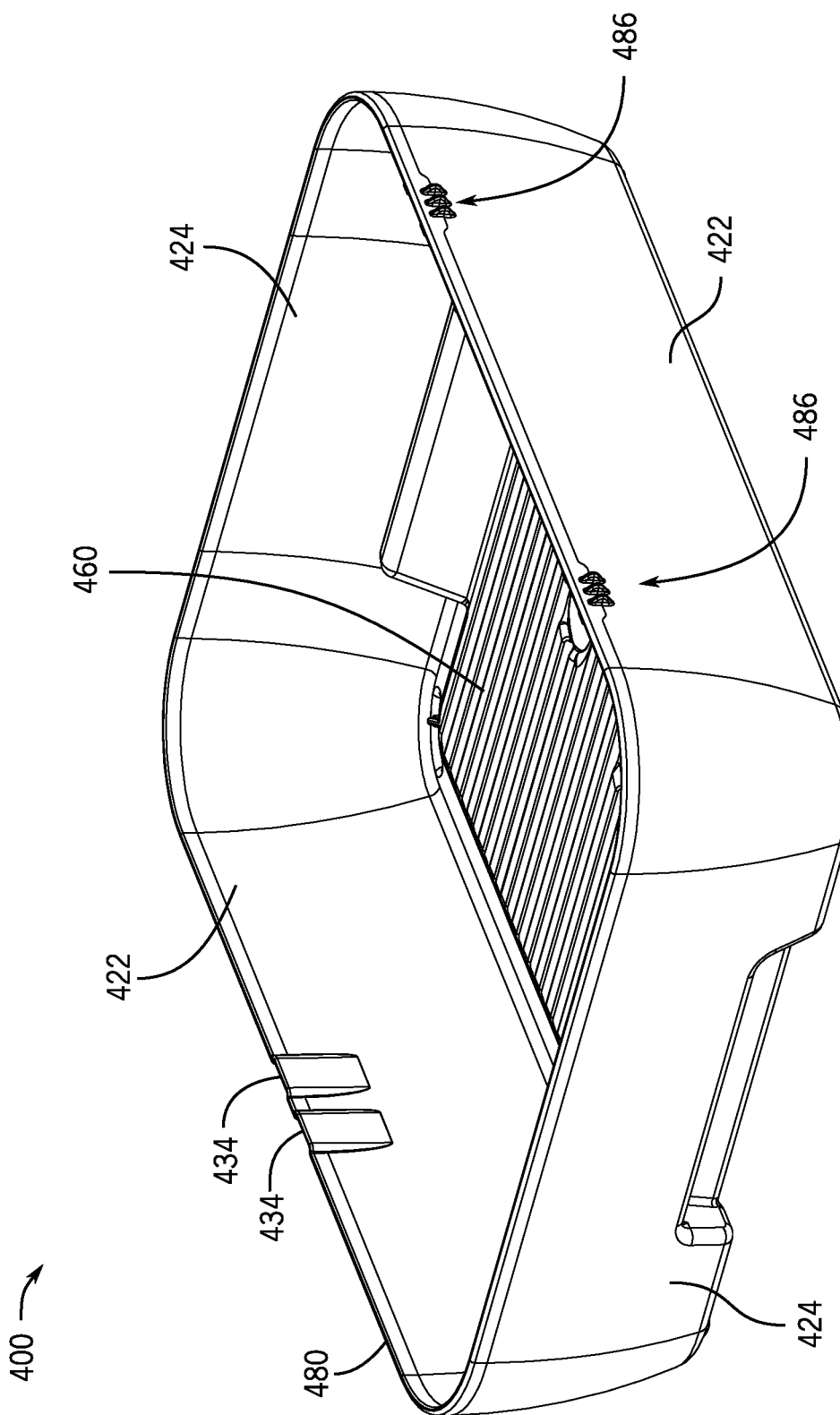
FIG. 20 is another perspective view of the receptacle of FIG. 19.

Referring now to FIGS. 19 and 20, perspective views of an alternate receptacle 400 are depicted. Many of the features of the receptacle 400 are identical or substantially similar to the receptacle 12, depicted and described above with reference to FIGS. 1-8. For example, the receptacle 400 is shown to include a pair of opposing side walls 422 and a pair of opposing end walls 424. Each of the side walls 422 and the end walls 424 extends upwardly from a periphery of a corrugated bottom wall 460, terminating in a top receptacle edge 480. One of the sidewalls 422 is shown to include multiple latch recesses 432 that are situated below latch indicator recesses 434. On the side wall 422 opposite the recesses 432, 444, the receptacle 400 is shown to include a pair of internal clip indexing features 482. Referring specifically to FIG. 20, the side wall 422 opposite the recesses 432, 444 is further shown to include a pair of external detent ribs 486.

Figure 21:
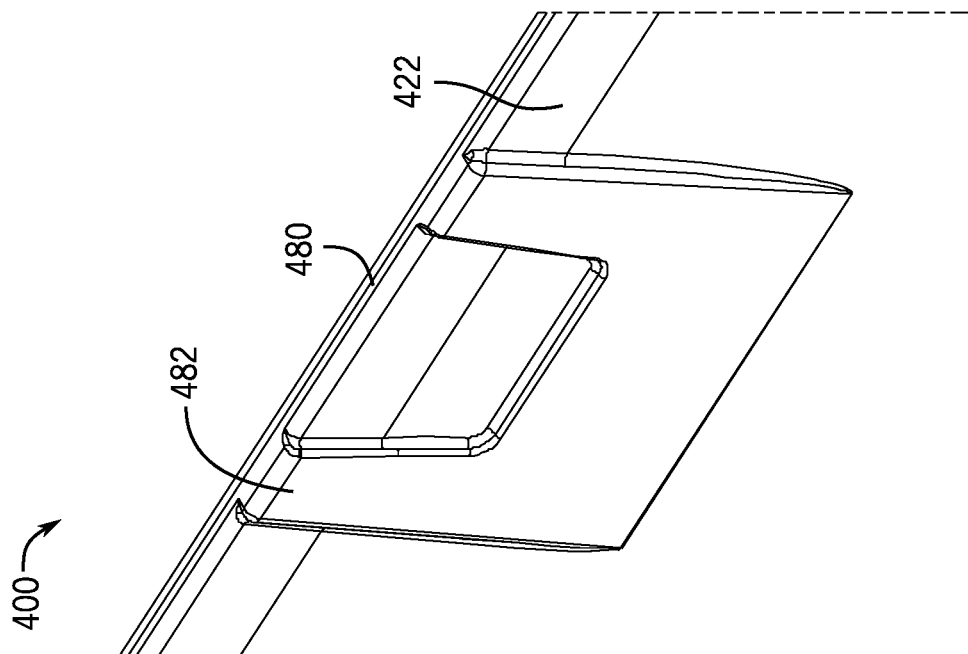
FIG. 21 is a detail view of an internal clip retention feature included in the receptacle of FIG. 19.

The clip indexing features 482 and the external detent ribs 486 are positioned on the receptacle 400 to correspond to the positions of living hinge clips (e.g., living hinge clips 84) on the lid (e.g., lid 16). As shown in FIG. 21, each of the clip indexing features 482 is generally U-shaped and extends from the side wall 422. The clip indexing features 482 may be utilized as a visual signal for the user to aid in locating the living hinge clips relative to the receptacle 400. In an exemplary implementation, the distance that the clip indexing feature 482 extends from the side wall 422 is tapered such that the clip indexing feature 482 is thickest near the top receptacle edge 480.

Figure 22:
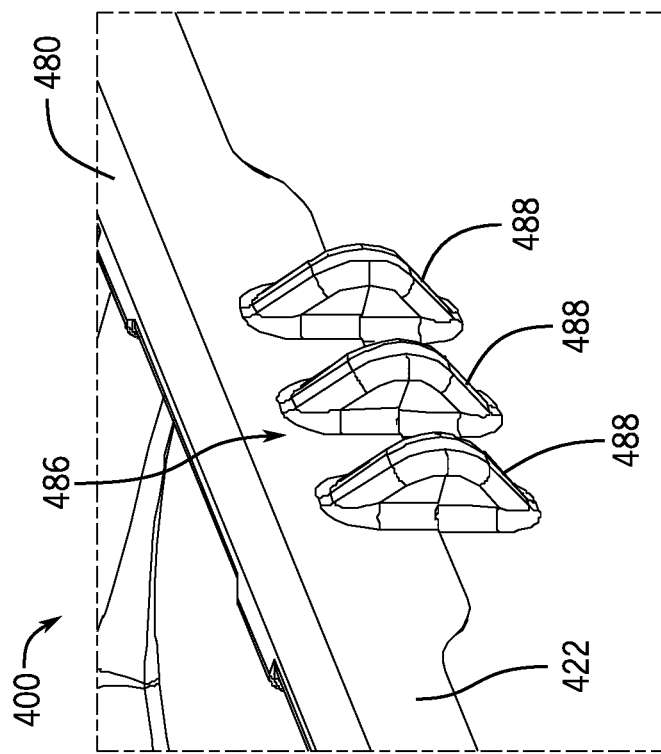
FIG. 22 is a detail view of an external clip retention included in the receptacle of FIG. 19.

As best shown in FIG. 22, each of the pair of external detent ribs 486 may include multiple rib components 488. In an exemplary implementation, each of the pair of external detent ribs 486 includes three vertical rib components 488, although in other implementations, a different number of rib components 488 may be utilized. Each of the rib components 488 is shown to be substantially arc-shaped in order to avoid sharp edges on the exterior of the receptacle 400. In some implementations, the vertical rib components 488 may be connected to each other by a horizontal rib (not shown) in order to minimize the risk of fracture of the rib components 488.

Figure 23:
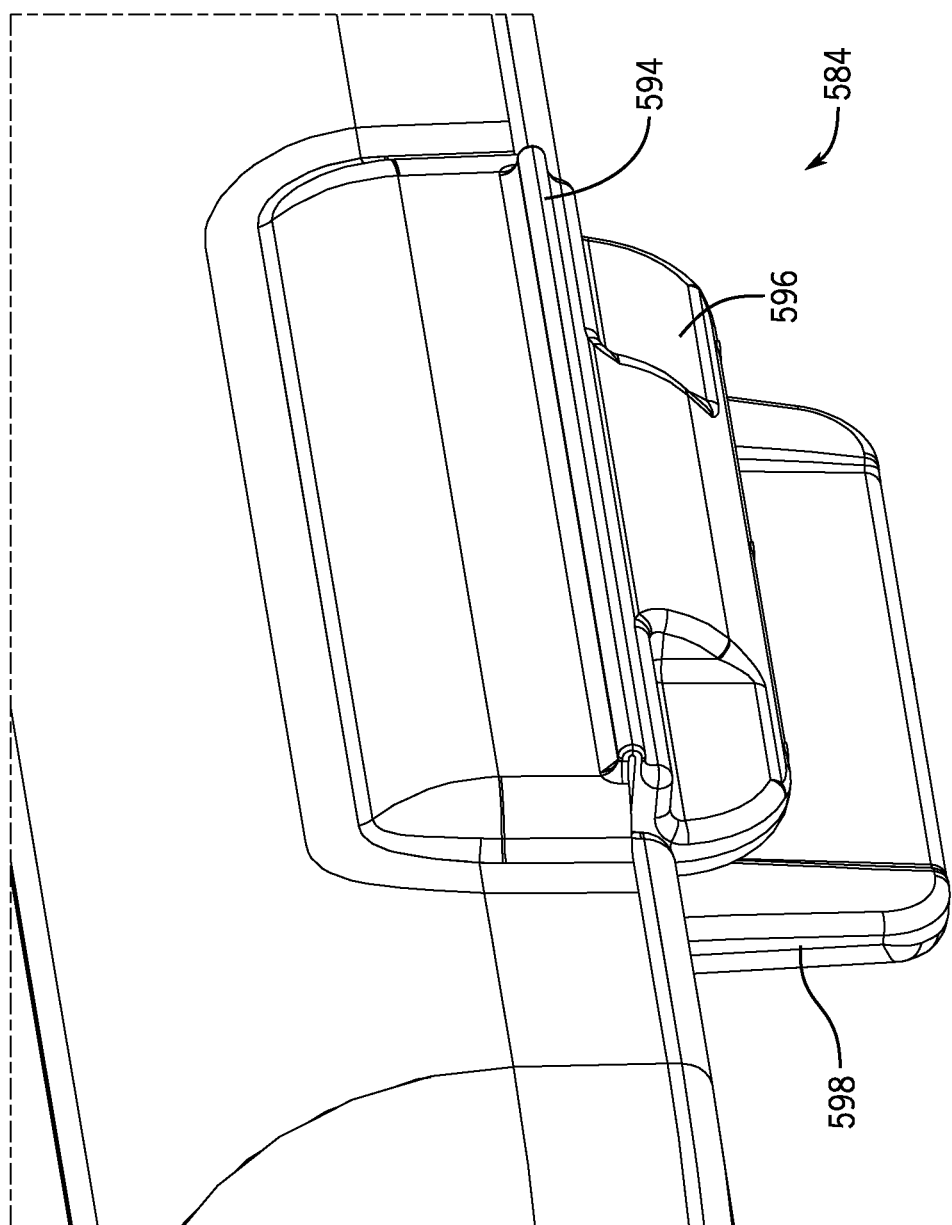
FIG. 23 is a detail view of an alternate clip that may be utilized in the lid of FIG. 9.
Figure 24:
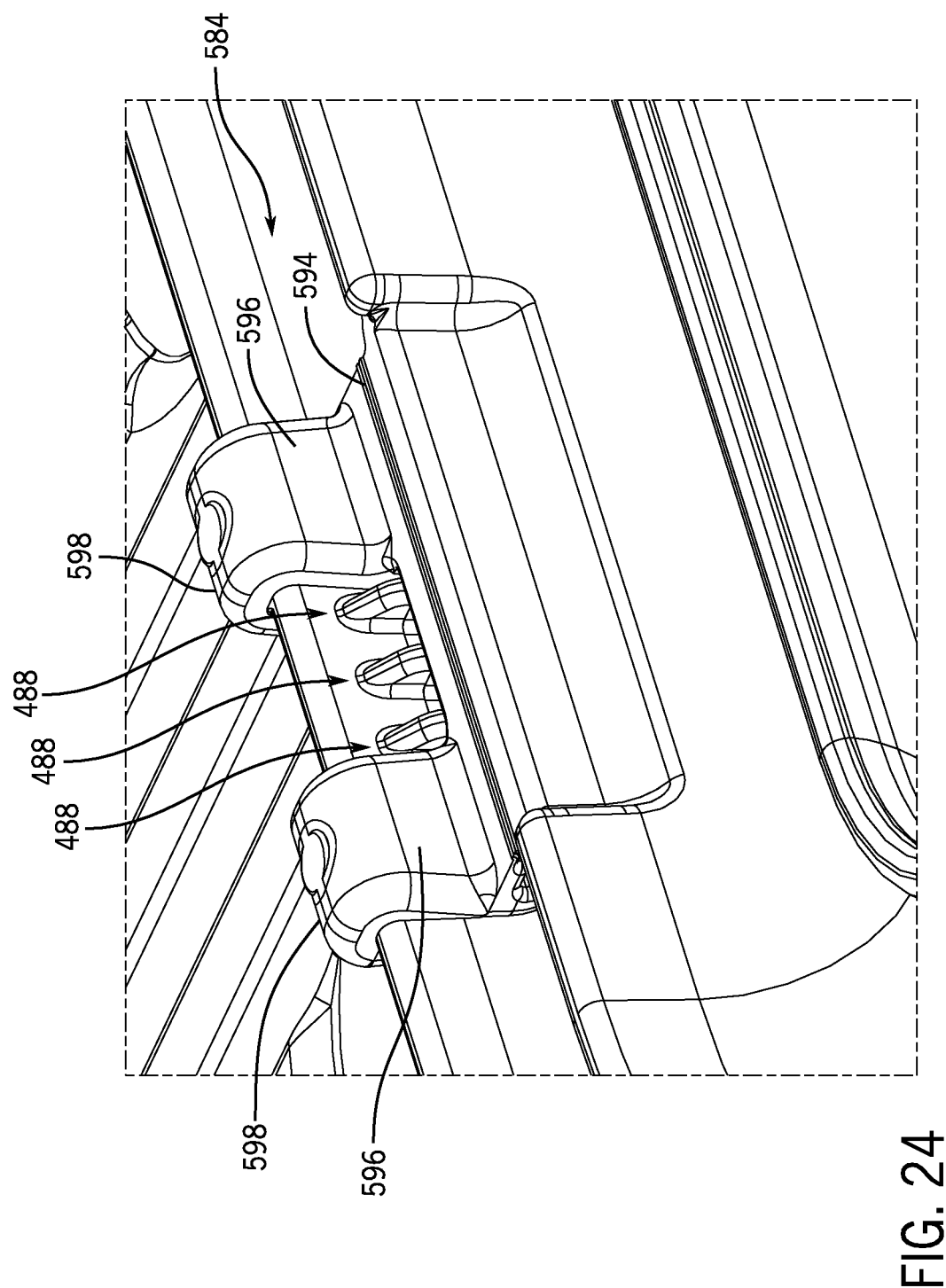
FIG. 24 is a detail view depicting the hinged coupling of the receptacle of FIG. 19 and the clip of FIG. 23.

FIG. 23 depicts a perspective view of an alternate living hinge clip 584 that may be incorporated on a lid (e.g., lid 16). A living hinge portion 594 of the clip 584 permits a lid assembly (e.g., lid assembly 14) to pivot between the closed position and the opened position. Adjacent the living hinge portion 594, each clip 584 includes an exterior clip portion 596 and an interior clip portion 598. As shown in FIG. 24, the exterior clip portion 596 and the interior clip portion 598 are generally C-shaped, and a gap in the exterior clip portion 596 permits the clip 584 to be located around the detent rib components 488. The rib components 488 create an audible signal (e.g., a snapping sound) that the clip 584 has been successfully located on the receptacle. In addition, the rib components 488 act to retain the clip 584 on the receptacle.

Figure 25:
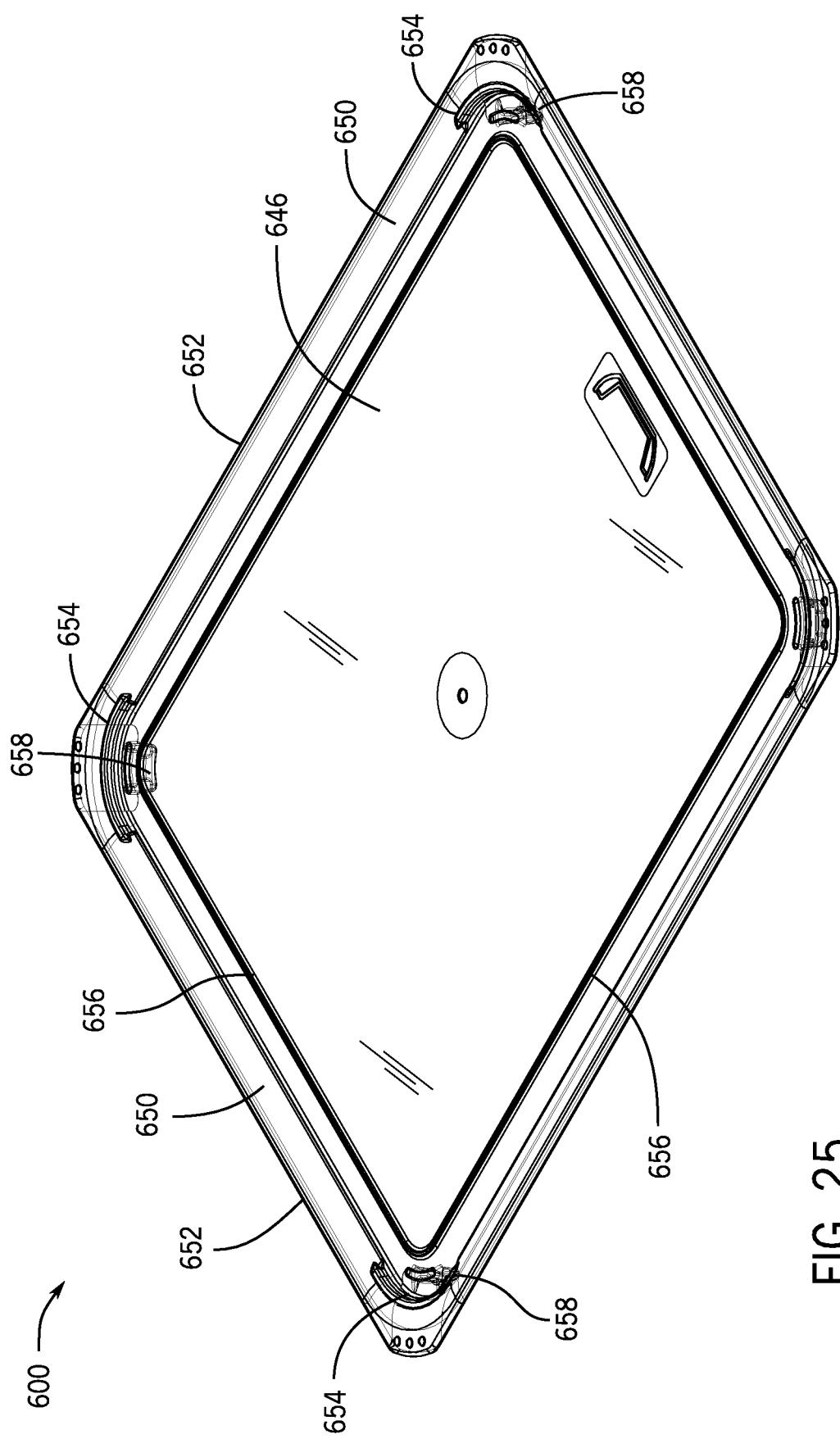
FIG. 25 is a perspective view of another cover that may be utilized in the decorative holder assembly of FIG. 1.

Referring now to FIG. 25, an alternate cover 600 is depicted according to an exemplary implementation. Similar to the cover 18 (depicted in FIGS. 13-15), the alternate cover 600 includes a central wall 646. However, unlike the cover 18, the central wall 646 is surrounded only by an upwardly sloping peripheral wall 650, rather than both downwardly sloping and upwardly sloping walls. The upwardly sloping peripheral wall 650 is shown to terminate in a horizontal lip 652, and stacking recesses 654 are formed in each of the corners of the upwardly sloping peripheral wall 656. In addition, a stacking ridge 656 extends upwardly from the central wall 646. In an exemplary implementation, the stacking ridge 656 has a generally rectangular-shaped perimeter, and together, the stacking recesses 654 and the stacking ridge 656 interact with corresponding features (e.g., interlocking protrusions, recesses) located on an exterior surface of a bottom wall (e.g., bottom wall 60) of a receptacle (e.g., receptacle 12, receptacle 400) to limit relative movement of the cover 600 and a receptacle stacked atop the cover 600.

Figure 26:
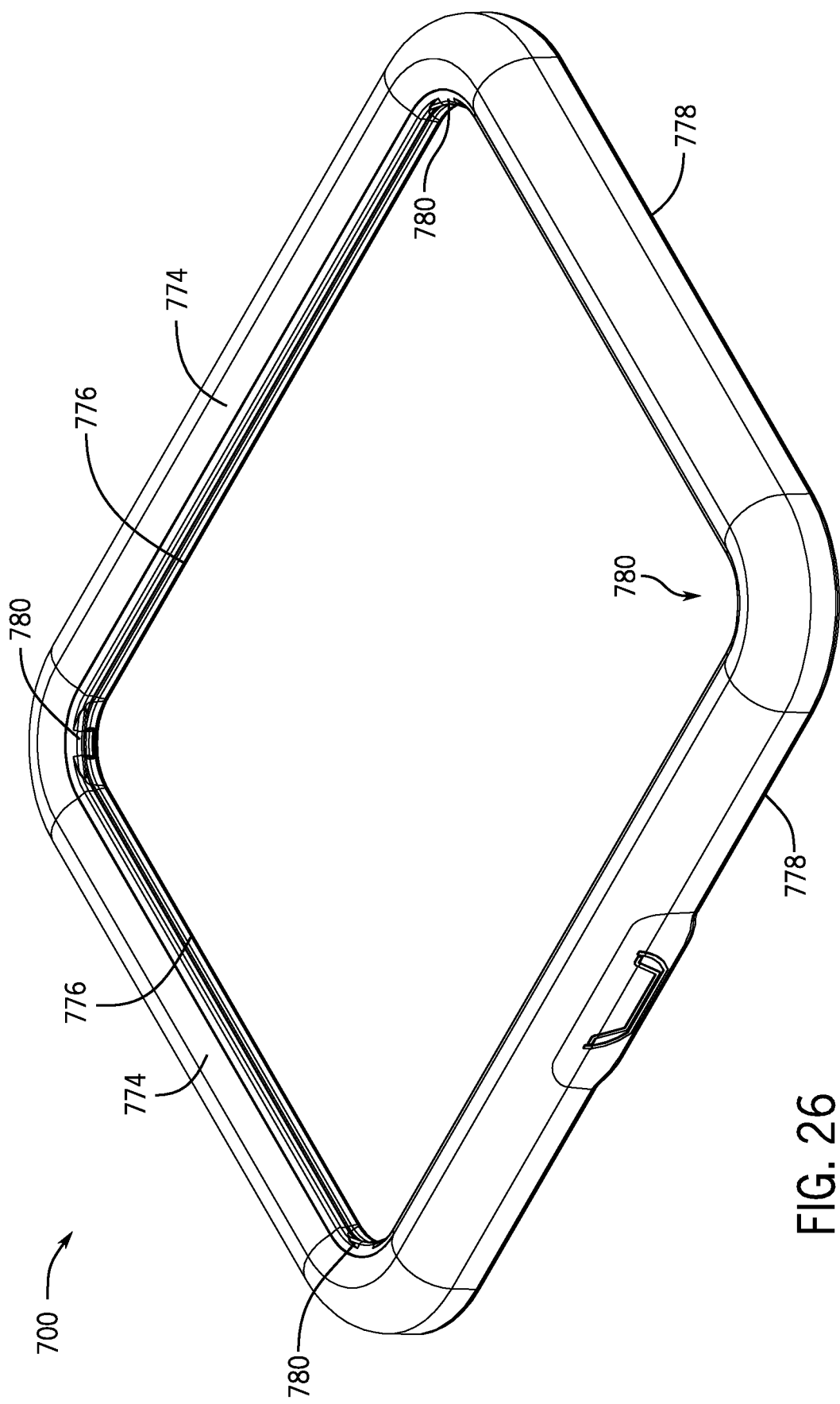
FIG. 26 is a perspective view of another lid that may be utilized with the cover of FIG. 25.
Figure 27:
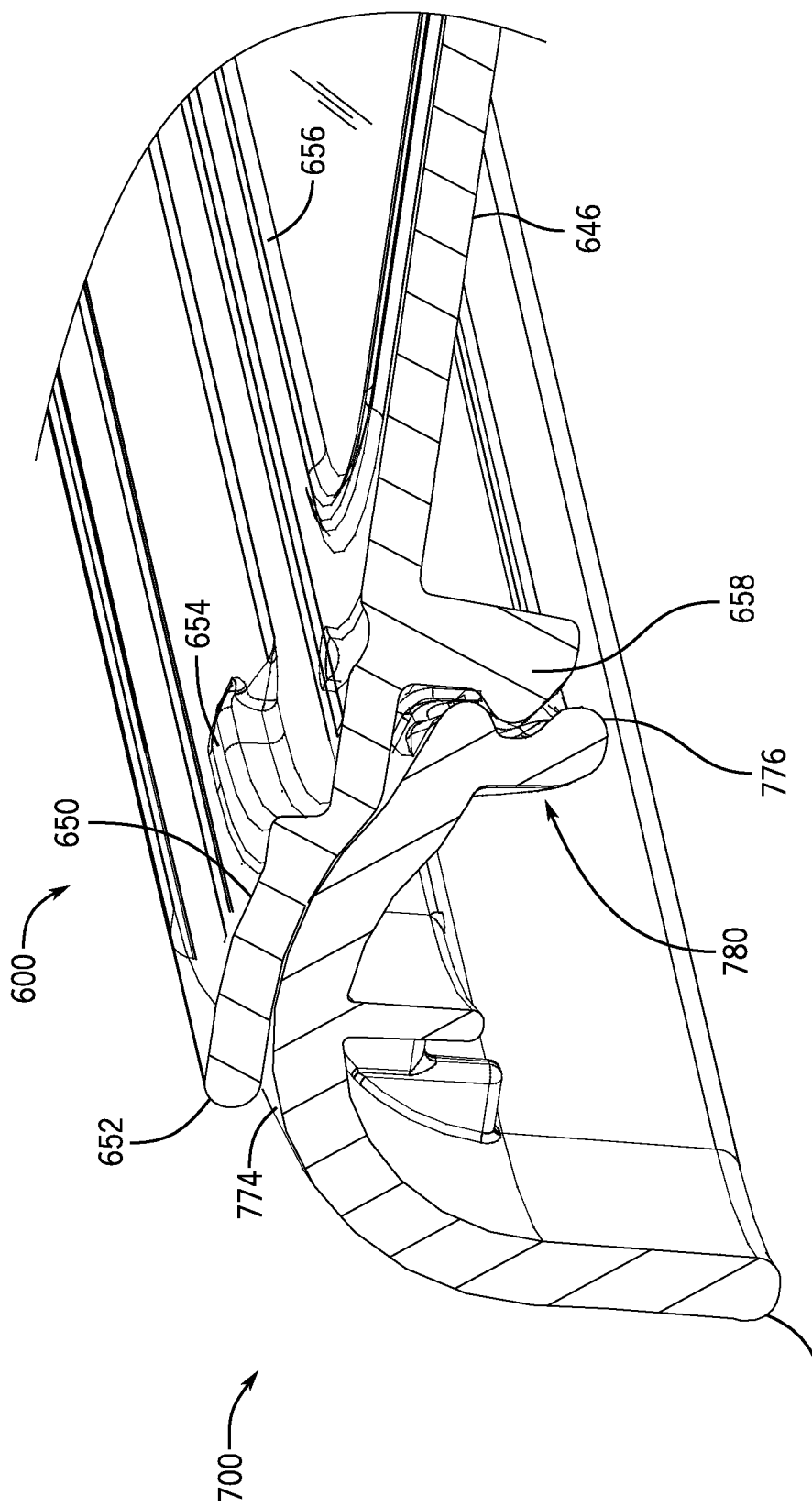
FIG. 27 is a side cross-sectional view depicting the coupling of the cover of FIG. 25 and the lid of FIG. 25.

Still referring to FIG. 25, the cover 600 is further shown to include generally arc-shaped retaining protrusions 658 extending outwardly from the peripheral wall 650 opposite the stacking recesses 654. FIG. 26 depicts an alternate lid 700 that is configured to be mated to the cover 600 using the retaining protrusions 658. As shown, the lid 700 generally consists of an outer surface 774 that extends from an inner peripheral edge 776 to an outer peripheral edge 778. An arc-shaped cover receiving tab 780 is formed in each of the corners of the 774, and as shown in the cross-sectional view of FIG. 27, the retaining protrusions 658 are configured to fit within recesses in the corner receiving tabs 780 to retain the cover 600 when the cover 600 is coupled to the lid 700.

Figure 28:
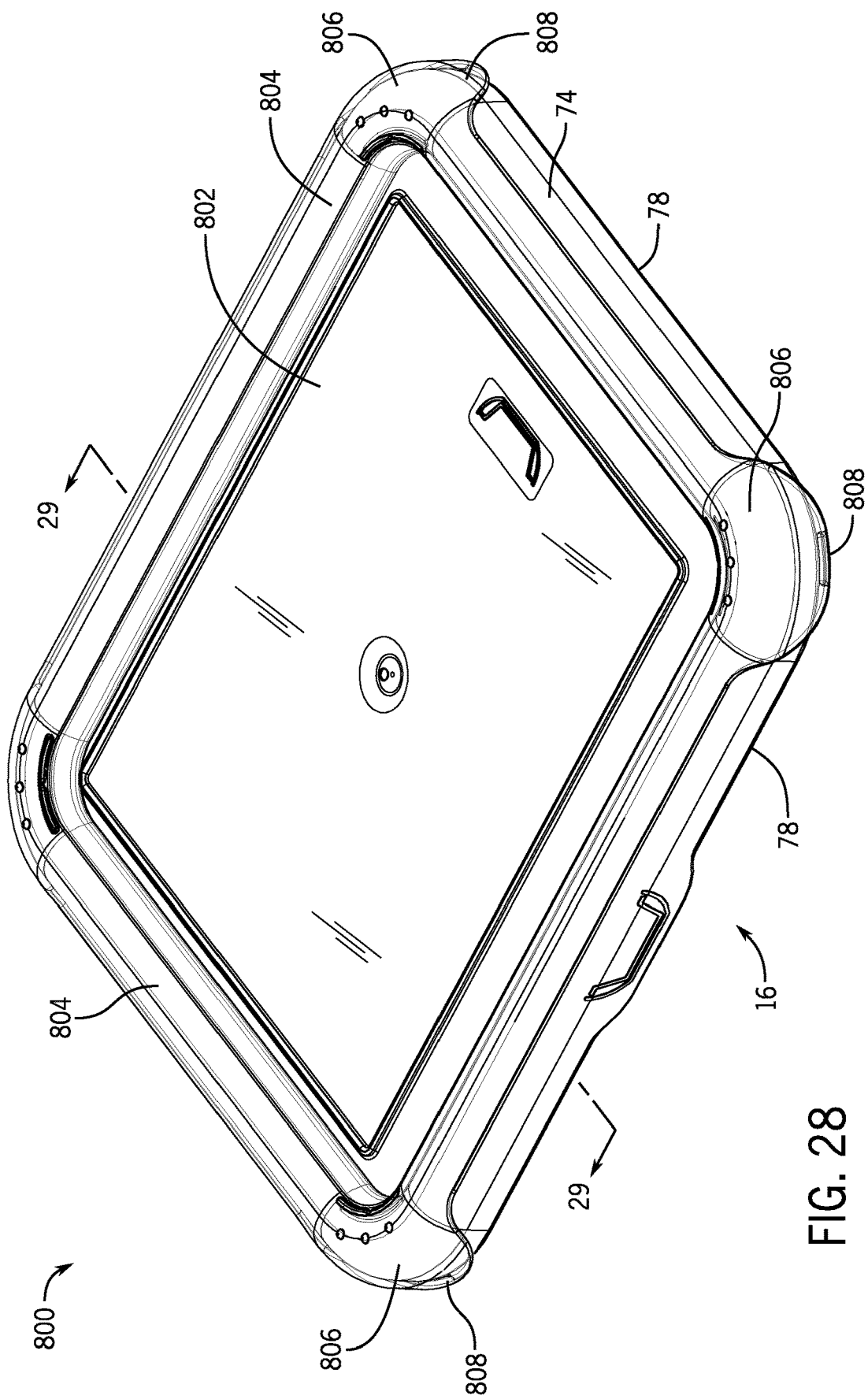
FIG. 28 is a perspective view of another cover and lid assembly that may be utilized in the decorative holder assembly of FIG. 1.
Figure 29:
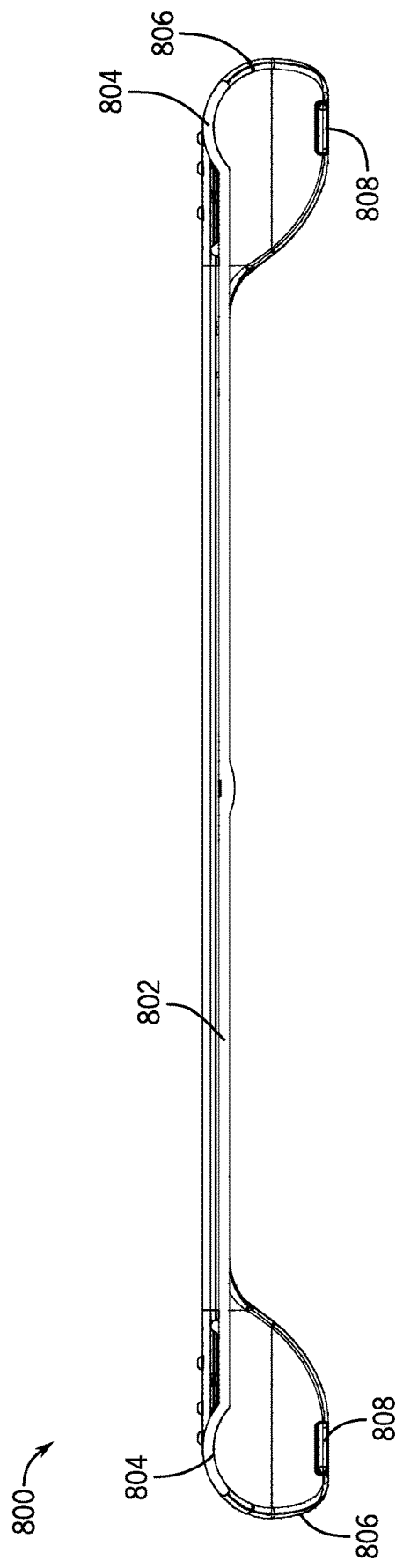
FIG. 29 is a side cross-sectional view depicting the cover of FIG. 28.

FIGS. 28 and 29 depict perspective and side cross-sectional views of another alternate cover 800. As depicted in FIG. 28, the cover 800 may be coupled to the lid 16 (depicted in FIGS. 9-10). The cover 800 is shown to include a central wall 802 surrounded by an upwardly sloping peripheral wall 804. Corner walls 806 extend downwardly from the peripheral wall 804 and over a portion of the outer surface 74 of the lid 16. A generally arc-shaped retaining protrusion 808 (best depicted in FIG. 29) extends inwardly from each of the corner walls 806. As opposed to fitting within a recess formed in the lid 16, the retaining protrusions 808 fit underneath the outer peripheral edge 78 of the lid 16 to retain the cover 800 when the cover 800 is coupled to the lid 16.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. A decorative holder for a foodstuff tray, comprising:
a receptacle having a bottom wall, a pair of opposing side walls, and a pair of opposing end walls, wherein the side walls and the end walls extend upwardly from an outer periphery of the bottom wall and terminate in a top edge;
a lid that is hingably coupled to the top edge of the receptacle and configured to pivot between an opened position and a closed position, the lid defining a central opening providing access to an interior region of the decorative holder when disposed atop the receptacle; and
a foodstuff tray located in the interior region and comprising a supporting wall having a plurality of foodstuff holding locations formed therein and a plurality of legs extending from the supporting wall;
wherein the plurality of legs of the foodstuff tray are configured to rest upon the bottom wall of the receptacle; and
wherein the plurality of legs are configured such that an uppermost surface of the supporting wall is positioned between the side walls and the end walls and below the top edge of the receptacle.

2. The decorative holder of claim 1, wherein the supporting wall of the foodstuff tray comprises a plurality of grab recesses facing at least one of the pair of opposing side walls or at least one of the pair of opposing end walls of the receptacle, each of the plurality of grab recesses configured to permit a user to insert a finger between the foodstuff tray and the at least one of the pair of opposing side walls or the at least one of the pair of opposing end walls of the receptacle.

3. The decorative holder of claim 1, wherein the bottom wall of the receptacle comprises a plurality of tray locating recesses configured to receive the plurality of legs of the foodstuff tray.

4. The decorative holder of claim 1, wherein the foodstuff tray comprises a first foodstuff tray, and wherein the supporting wall of the first foodstuff tray comprises a plurality of recesses configured to receive a plurality of legs of a second foodstuff tray stacked atop the first foodstuff tray.

5. The decorative holder of claim 4, wherein the plurality of recesses configured to receive the plurality of legs are arc-shaped.

6. The decorative holder of claim 1, further comprising a hot pack or a cold pack positioned between the plurality of legs of the foodstuff tray such that a top surface of the hot pack or the cold pack is located below the supporting wall of the foodstuff tray.

7. The decorative holder of claim 1, wherein at least a portion of the plurality of foodstuff holding locations comprises an indentation formed in the supporting wall of the foodstuff tray.

8. The decorative holder of claim 1, wherein at least a portion of the plurality of foodstuff holding locations comprises a hole formed through the supporting wall of the foodstuff tray.

9. The decorative holder of claim 1, wherein at least a portion of the plurality of foodstuff holding locations is oval-shaped or circular-shaped.

10. A decorative holder for a plurality of foodstuff trays, comprising:
a receptacle having a bottom wall, a pair of opposing side walls, and a pair of opposing end walls, wherein the side walls and the end walls extend upwardly from an outer periphery of the bottom wall and terminate in a top edge;
a lid that is hingably coupled to the top edge of the receptacle and configured to pivot between an opened position and a closed position, the lid defining a central opening providing access to an interior region of the decorative holder when disposed atop the receptacle;
a cover that is detachably coupled to the lid to form a lid assembly; and
a plurality of foodstuff trays stacked in the interior region and comprising at least a lowermost foodstuff tray and an uppermost foodstuff tray, each foodstuff tray comprising a supporting wall having a plurality of foodstuff holding locations formed therein and a plurality of legs extending from the supporting wall;

wherein the plurality of legs of the lowermost foodstuff tray are configured to rest upon the bottom wall of the receptacle; and wherein the plurality of foodstuff holding locations of the uppermost foodstuff tray are located within the interior region.

11. The decorative holder of claim 10, wherein the supporting wall of the lowermost foodstuff tray comprises a plurality of recesses configured to receive the plurality of legs of one of the plurality of foodstuff trays positioned above the lowermost foodstuff tray.

12. The decorative holder of claim 11, wherein the plurality of recesses configured to receive the plurality of legs are arc-shaped.

13. The decorative holder of claim 10, wherein the bottom wall of the receptacle comprises a plurality of tray locating recesses configured to receive the plurality of legs of the lowermost foodstuff tray.

14. The decorative holder of claim 10, further comprising a hot pack or a cold pack positioned between the plurality of legs of the lowermost foodstuff tray such that a top surface of the hot pack or the cold pack is located below the supporting wall of the lowermost foodstuff tray.

15. The decorative holder of claim 10, wherein the supporting wall of each of the plurality of foodstuff trays comprises a plurality of grab recesses facing at least one of the pair of opposing side walls or at least one of the pair of opposing end walls of the receptacle, each of the plurality of grab recesses configured to permit a user to insert a finger between the foodstuff tray and the at least one of the pair of opposing side walls or the at least one of the pair of opposing end walls of the receptacle.

16. The decorative holder of claim 10, wherein at least a portion of the plurality of foodstuff holding locations comprises an indentation formed in the supporting wall of each of the plurality of foodstuff trays.

17. The decorative holder of claim 10, wherein at least a portion of the plurality of foodstuff holding locations comprises a hole formed through the supporting wall of each of the plurality of foodstuff trays.

18. The decorative holder of claim 10, wherein at least a portion of the plurality of foodstuff holding locations is oval-shaped or circular-shaped.

19. The decorative holder of claim 10, wherein the cover further comprises a plurality of stacking protrusions, and wherein the plurality of stacking protrusions are configured to interlock with a plurality of corresponding features on the receptacle to prevent relative movement of the cover and the receptacle when the decorative holder is in a stacked configuration.

* * * * *